(12) United States Patent
Nishida

(10) Patent No.: US 8,279,382 B2
(45) Date of Patent: Oct. 2, 2012

(54) DISPLAY DEVICE

(75) Inventor: Kenji Nishida, Otsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 760 days.

(21) Appl. No.: 12/375,246

(22) PCT Filed: Mar. 28, 2007

(86) PCT No.: PCT/JP2007/056658
§ 371 (c)(1),
(2), (4) Date: Jan. 27, 2009

(87) PCT Pub. No.: WO2008/015815
PCT Pub. Date: Feb. 7, 2008

(65) Prior Publication Data
US 2009/0262287 A1    Oct. 22, 2009

(30) Foreign Application Priority Data

Aug. 2, 2006    (JP) ................................ 2006-210902

(51) Int. Cl.
*G02F 1/1335* (2006.01)
(52) U.S. Cl. ........................................ 349/114; 349/141
(58) Field of Classification Search ........................ None
See application file for complete search history.

(56) References Cited

U.S. PATENT DOCUMENTS

| | | | |
|---|---|---|---|
| 5,970,338 A | 10/1999 | Tempel | |
| 6,111,626 A | 8/2000 | Watanabe et al. | |
| 6,281,952 B1 | 8/2001 | Okamoto et al. | |
| 6,538,713 B1 | 3/2003 | Yanagawa et al. | |
| 7,088,409 B2 | 8/2006 | Itou et al. | |
| 2001/0052948 A1 | 12/2001 | Okamoto et al. | |
| 2003/0123012 A1 | 7/2003 | Yanagawa | |
| 2003/0218664 A1 | 11/2003 | Sakamoto et al. | |

(Continued)

FOREIGN PATENT DOCUMENTS

CN    1195425 A    10/1998

(Continued)

OTHER PUBLICATIONS

U.S. Appl. No. 12/307,639, filed Jan. 6, 2009; Nishida.

(Continued)

*Primary Examiner* — Thanh-Nhan P. Nguyen
(74) *Attorney, Agent, or Firm* — Nixon & Vanderhye P.C.

(57) ABSTRACT

The present invention provides a display device which can provide bright display by both of reflective display and transmissive display without having a multi-gap structure and which can reduce a difference in response time between the reflective region and the transmissive region. The display device of the present invention is a display device including: a pair of substrates; a display medium interposed between the pair of substrates; and a pixel having a reflective region for performing reflective display and a transmissive region for performing transmissive display, wherein the display device includes a pixel electrode and a common electrode on one of the pair of substrates, a voltage is applied to the display medium through the pixel electrode and the common electrode, the pixel electrode is provided with a plurality of slits, the plurality of slits include a pair of line-symmetric slits, and a slit arranged between the pair of line-symmetric slits, of inner contours facing each other of the pair of line-symmetric slits, one forms an angle with the other, and an axis of symmetry of the pair of line-symmetric slits is positioned in the reflective region.

28 Claims, 14 Drawing Sheets

U.S. PATENT DOCUMENTS

| | | | |
|---|---|---|---|
| 2005/0083462 A1 | 4/2005 | Lin | |
| 2005/0105033 A1 | 5/2005 | Itou | |
| 2005/0128407 A1 | 6/2005 | Lee et al. | |
| 2005/0140620 A1 | 6/2005 | Aoyama et al. | |
| 2005/0157239 A1 | 7/2005 | Yoo | |
| 2005/0213013 A1 | 9/2005 | Chen et al. | |
| 2005/0243251 A1 | 11/2005 | Yang et al. | |
| 2005/0253989 A1* | 11/2005 | Chen et al. | 349/141 |
| 2005/0264720 A1* | 12/2005 | Itou et al. | 349/99 |
| 2005/0264731 A1* | 12/2005 | Itou et al. | 349/114 |
| 2006/0050385 A1 | 3/2006 | Uehara | |
| 2006/0092363 A1 | 5/2006 | Hasegawa | |
| 2006/0268206 A1 | 11/2006 | Nishimura | |
| 2007/0013835 A1 | 1/2007 | Matsushima et al. | |
| 2007/0040978 A1 | 2/2007 | Nakayoshi et al. | |
| 2007/0109455 A1 | 5/2007 | Kim et al. | |
| 2007/0165171 A1 | 7/2007 | Lee | |
| 2009/0201449 A1 | 8/2009 | Nishida | |
| 2009/0207366 A1 | 8/2009 | Kim | |
| 2009/0225261 A1 | 9/2009 | Hasegawa et al. | |
| 2009/0262286 A1 | 10/2009 | Nishida | |
| 2009/0262287 A1 | 10/2009 | Nishida | |

FOREIGN PATENT DOCUMENTS

| | | |
|---|---|---|
| CN | 1603915 A | 4/2005 |
| EP | 1 744 205 | 1/2007 |
| EP | 1 912 093 | 4/2008 |
| JP | 11-174493 | 7/1999 |
| JP | 11-242226 | 9/1999 |
| JP | 2000-305097 | 11/2000 |
| JP | 2001-166321 | 6/2001 |
| JP | 2003-149664 | 5/2003 |
| JP | 2005-106967 | 4/2005 |
| JP | 2005-208567 | 8/2005 |
| JP | 2005-338264 | 12/2005 |
| JP | 2006-126602 | 5/2006 |
| JP | 2006-184325 A | 7/2006 |
| JP | 2007-004125 | 1/2007 |
| JP | 2007-047734 | 2/2007 |
| JP | 2007-058007 | 3/2007 |
| JP | 2007-183585 A | 7/2007 |
| WO | WO 2005/006068 | 1/2005 |

OTHER PUBLICATIONS

U.S. Appl. No. 12/373,983, filed Jan. 15, 2009; Nishida.
International Search Report for PCT/JP2007/053214, mailed Mar. 20, 2007.
Lim et al, "A Single Gap Transflective Display with Single Gamma Curve in the Fringe Field Switching Mode", Japanese Journal of Applied Physics, Japan Society of Applied Physics, Tokyo, JP, vol. 44, No. 50, Jan. 1, 2005, pp. L1532-L1534.
EP Supplementary Search Report mailed Jul. 27, 2009 in corresponding EP application 07740092.7.
EP Supplementary Search Report mailed Jul. 27, 2009 in corresponding EP application 09001552.0.
JP Office Action mailed Oct. 6, 2009 in corresponding JP application 2008-525796.
JP Office Action mailed Oct. 6, 2009 in corresponding JP application 2008-279551.
CN Office Action mailed Feb. 3, 2010 in corresponding Chinese application 2007800270418.
International Search Report for PCT/JP2007/056658, mailed Jun. 5, 2007.
Office Action for U.S. Appl. No. 12/373,983 mailed Aug. 16, 2011; Nishida.
Office Action for U.S. Appl. No. 12/307,639 mailed Jun. 7, 2011; Nishida.
Election Requirement for U.S. Appl. No. 12/373,983 mailed Feb. 2, 2011; Nishida.
Office Action for U.S. Appl. No. 12/373,983 mailed Mar. 22, 2011; Nishida.
International Search Report for PCT/JP2007/056654 mailed Jun. 12, 2007.
Notice of Allowance for U.S. Appl. No. 12/307,639 mailed Dec. 9, 2011; Nishida.
Notice of Allowance mailed Nov. 29, 2011 in U.S. Appl. No. 12/373,983.

* cited by examiner

DISPLAY DEVICE

This application is the U.S. national phase of International Application No. PCT/JP2007/056658, filed 28 Mar. 2007, which designated the U.S. and claims priority to Japanese Application No. 2006-210902, filed 2 Aug. 2006, the entire contents of each of which are hereby incorporated by reference.

TECHNICAL FIELD

The present invention relates to a display device. More specifically, the present invention relates to a display device preferably used in a liquid crystal display in accordance with In Plane Switching (IPS) mode or Fringe Field Switching (FFS) mode.

BACKGROUND ART

Display devices such as a liquid crystal display device have been widely used in electronics such as a monitor, a projector, a cellular phone, and a personal digital assistant (PDA). Reflective, transmissive, and transflective display devices are mentioned as a display type of the liquid crystal display devices. Under relatively dark environments such as indoor environment, the transmissive liquid crystal display device which provides display using light from a backlight is mainly used. Under relatively bright environments such as outdoor environment, the reflective liquid crystal display device which provides display using external light is mainly used. The transflective liquid crystal display device can provide both of transmissive display and reflective display, and mainly provides transmissive display under indoor environments and provides reflective display under outdoor environments. Therefore, such a transflective liquid crystal display device can provide display with high qualities under any environments regardless of indoor or outdoor environments, and it has been widely equipped with mobile equipment such as a cellular phone, a PDA, and a digital camera. According to the transflective liquid crystal display device, for example, a Vertical Alignment (VA) mode is used as display mode. The VA mode is a mode in which a liquid crystal molecule is aligned to be vertical to the substrate surface when a voltage is not applied and display is carried out by tilting the liquid crystal molecule by application of a voltage.

However, according to the transflective liquid crystal display device, reflective light passes through the liquid crystal layer twice, but transmissive light passes through the liquid crystal layer only once. Therefore, if a cell gap is designed to be optimal for reflective light, the transmittance of the transmissive light is about ½ of the optimal value. As a solution for this, a method in which the reflective region and the transmissive region are formed to have different cell gaps to form a multi-gap structure, and the thickness of the liquid crystal layer in the reflective region is decreased is mentioned (for example, refer to Patent Document 1). However, this method needs to form irregularities on the substrate, which complicates the structure on the substrate. Further, the production steps of the substrate need to be performed with high accuracy. Therefore, such a method has room for improvement. In addition, there is room for improvement also in that the response time of the liquid crystal molecule is different between the reflective region and the transmissive region.

IPS mode and FFS mode have been known as display mode of the liquid crystal display device, in addition to the VA mode. According to the IPS and FFS modes, liquid crystal is operated by a horizontal electric field generated by a pair of electrodes for driving the liquid crystal, formed on one substrate. According to these systems, the liquid crystal molecule moves in the horizontal direction (in the direction parallel to the substrates), which widens the viewing angle. A transflective liquid crystal display device in IPS mode is disclosed (for example, refer to Patent Document 2). This device in IPS mode also has a multi-gap structure, and it fails to solve the above-mentioned problems.

[Patent Document 1]
  Japanese Kokai Publication No. Hei-11-242226
[Patent Document 2]
  Japanese Kokai Publication No. 2005-338264

DISCLOSURE OF INVENTION

The present invention has been made in view of the above-mentioned state of the art. The present invention has an object to provide a display device which can provide bright display by both of reflective display and transmissive display without having a multi-gap structure and which can reduce a difference in response time between the reflective region and the transmissive region.

The present inventor made various investigations on a display device which can provide bright display by both of reflective display and transmissive display without having a multi-gap structure. The inventor noted an arrangement relationship between a pixel electrode and a common electrode in the reflective region and the transmissive region. The inventor found the followings. An intensity of the electric field generated between the pixel electrode and the common electrode in the reflective region can be made smaller than that in the transmissive region without forming the multi-gap structure, if, in the horizontal electric field mode such as IPS mode and FFS mode, the pixel electrode is provided with a plurality of slits; the plurality of slits include a pair of line-symmetric slits and a slit arranged between the pair of line-symmetric slits; of inner contours facing each other of the pair of line-symmetric slits, one forms an angle with the other; and an axis of symmetry of the pair of line-symmetric slits is positioned in the reflective region. As a result, light use efficiency in the reflective display and the transmissive display can be adjusted. As a result, the above-mentioned problems have been admirably solved, leading to completion of the present invention.

That is, the present invention is a display device including: a pair of substrates; a display medium interposed between the pair of substrates; and a pixel having a reflective region for performing reflective display and a transmissive region for performing transmissive display, wherein the display device includes a pixel electrode and a common electrode on one of the pair of substrates, a voltage is applied to the display medium through the pixel electrode and the common electrode, the pixel electrode is provided with a plurality of slits, the plurality of slits include a pair of line-symmetric slits, and a slit arranged between the pair of line-symmetric slits, of inner contours facing each other of the pair of line-symmetric slits, one forms an angle with the other, and an axis of symmetry of the pair of line-symmetric slits is positioned in the reflective region (hereinafter, also referred to as "the first display device").

The present invention is mentioned in more detail below.

The first display device of the present invention includes a pair of substrates, a display medium interposed between the pair of substrates, and a pixel having a reflective region for performing reflective display and a transmissive region for performing transmissive display. In the present invention, the kinds of the substrate and the display medium are not especially limited. For example, according to an active matrix liquid crystal display device, the following embodiment is mentioned. The active matrix liquid crystal display device includes: an active matrix substrate and a color filter substrate as a pair of substrates; and a liquid crystal layer interposed between these substrates as the display medium, wherein on the active matrix substrate, scanning wirings and signal wirings are arranged to be intersect with each other, and at each intersection, a TFT that is a switching element is arranged, and on the color filter substrate, color layers of red (R), green (G), and blue (B) are arranged in each pixel. The liquid crystal display device generally includes a polarizer, a backlight and the like, outside the substrates. The reflective display is a mode in which display is performed by reflecting light outputted from a front light arranged on the display surface side or external light, inside the display device. The transmissive display is a mode in which display is performed by transmitting light outputted from the backlight. The size of the reflective region and the transmissive region and the proportion of those regions in the pixel are not especially limited. The display device of the present invention is a transflective display device because the reflective region and the transmissive region are arranged in one pixel.

The display device of the present invention includes a pixel electrode and a common electrode on one of the substrates, and a voltage is applied to the display medium through the above-mentioned pixel electrode and the above-mentioned common electrode. If a voltage is applied to the pair of electrodes that are the pixel electrode and the common electrode, a horizontal electric field parallel to the substrates is generated in the display medium near the pixel electrode and the common electrode. This electric field controls the display medium. Examples of such a control mode employed in the present invention include: IPS mode in which the pixel electrode and the common electrode have a so-called comb-tooth shape and these electrodes are arranged in the same layer to be engaged with each other; and FFS mode in which the pixel electrode or the common electrode has a comb-tooth shape and these electrodes are arranged in different layers.

In the present invention, the pixel electrode is provided with a plurality of slits. Further, the plurality of slits include at least one pair of line-symmetric slits, and a slit arranged between the pair of line-symmetric slits. That is, the plurality of slits include at least one pair of line-symmetric slits which are symmetry with respect to a virtual line, and further, another slit exists between the pair of line-symmetric slits. The number of the slit arranged between the pair of line-symmetric slits is one or more. In the present invention, the line-symmetric slits may be substantially symmetry with respect to a line as long as the effects of the present invention can be exhibited. The number of the pair of the line-symmetric slits generally needs to be large enough for such slits to constitute the reflective region.

With regard to inner contours facing each other of the pair of line-symmetric slits, one inner contour forms an angle with the other. That is, in this case, the pair of line-symmetric slits are each formed in such a way that the inner contours facing each other of the pair of line-symmetric slits are not parallel to each other. Accordingly, the slits may be formed to have any shape other than a shape in which inner contours facing each other of the slits are parallel to each other, formed when rectangles or quadrates are arranged in parallel to each other, for example. According to such an embodiment, the slit which is arranged between the pair of line-symmetric slits can be easily formed to have a width larger than a width of a slit formed in other regions. As the width of the slit increases, the intensity of the electric field generated between the pixel electrode and the common electrode decreases. The alignment degree of the liquid crystal varies depending on the electric field intensity, and therefore, by using this feature, use efficiency of light which passes through the liquid crystal can be adjusted.

An axis of symmetry of the above-mentioned pair of line-symmetric slits is positioned in the reflective region. According to the above-mentioned embodiment, in the region where the axis of symmetry of the line-symmetric slits is positioned and/or in the vicinity of such a region, a slit wider than a slit which is formed in other regions where no axis of symmetry of the line symmetric slits is positioned, can be easily arranged. Therefore, the region where the slit is arranged and/or the vicinity of such a region can be used as the reflective region. In addition, the width of the slit of the pixel electrode in the reflective region is not especially limited as long as an average of the slit width is larger than an average of the slit width of the pixel electrode in the transmissive region. For example, the slit of the pixel electrode in the reflective region may have a part whose width is equivalent to a width of the slit of the pixel electrode in the transmissive region. Further, an embodiment in which the maximum value of the slit width of the pixel electrode in the reflective region is larger than the maximum of the slit width of the pixel electrode in the transmissive region is preferable.

As a preferable embodiment of the pixel electrode in the first display device of the present invention, an embodiment in which the pixel electrode has a comb-tooth shape may be mentioned, for example. If the pixel electrode has a comb-tooth shape, a high-density horizontal electric field can be generated between the pixel electrode and the common electrode, and hence, the display medium can be controlled with high accuracy. The comb-tooth shape means a shape in which a plurality of short lines project from one long line. The shape of each comb tooth is not especially limited.

The following embodiments are mentioned as a preferable embodiment of a slit provided for the pixel electrode. An embodiment in which the plurality of slits of the pixel electrode are entirely surrounded by the pixel electrode; an embodiment in which the plurality of slits of the pixel electrode have a rectangular shape having one bent part; an embodiment in which the plurality of slits of the pixel electrode have a zig-zag shape; an embodiment in which the plurality of slits of the pixel electrode have a circular arc shape; and an embodiment in which the plurality of slits of the pixel electrode have a meandering shape. According to such embodiments, the pixel electrode and the common electrode are effectively engaged with each other. As a result, a high-density horizontal electric field can be generated and hence, the display medium can be controlled with high accuracy.

As the above-mentioned preferable embodiment of the common electrode, an embodiment in which the common electrode is formed in a layer different from the pixel electrode, and an insulating film is between the pixel electrode and the common electrode, is also mentioned. According to the FFS mode in which the pixel electrode and the common electrode are arranged with an insulating film therebetween, a horizontal electric field parallel to the substrates can be generated in the display medium. As such an embodiment, an embodiment in which one electrode has a comb-tooth shape and the other electrode is flat and has no slits may be mentioned. According to the FFS mode, the present invention can be applied even in the case that the pixel electrode and the common electrode cannot be formed in the same layer because of limitation of aperture ratio and the like.

It is preferable that the axis of symmetry is positioned within the slit arranged between the pair of line-symmetric slits. That is, the slit of the pixel electrode is arranged in the region where the axis of symmetry of the pair of line-symmetric slits provided for the pixel electrode is positioned, and thereby the distance between the pixel electrodes with the slit therebetween can be easily increased. As a result, the intensity of the electric field generated between the pixel electrode and the common electrode can be effectively decreased.

Other preferable embodiments of the above-mentioned common electrode include an embodiment in which the common electrode is provided with a slit. In this case, it is preferable that the common electrode is arranged in a layer where the pixel electrode is formed. The common electrode is also provided with a slit and the slit of the common electrode is engaged with the slit of the pixel electrode. Further, such pixel electrode and common electrode are arranged in the same layer. According to such IPS mode, a horizontal electric field parallel to the substrates can be generated in the display medium. If the pixel electrode and the common electrode are formed in the same layer, the production steps can be simplified, which improves productivity.

It is preferable that the slit of the common electrode has substantially the same shape as a shape of the slit of the pixel electrode. According to such an embodiment, the intensity of the electric field generated at each part where the slit of the common electrode is engaged with the slit of the pixel electrode can be made uniform and as a result, alignment of the liquid crystal can be uniformly controlled. In addition, the slit of the common electrode may not entirely have the same shape as the shape of the slit of the pixel electrode, and it may partly have substantially the same shape. For example, a slit which has substantially the same shape as in the pair of line-symetric slits of the pixel electrode is provided for the common electrode to be arranged adjacent to the pair of line-symmetric slits of the pixel electrode. As a result, the distance between the pixel electrode and the common electrode in the reflective region can be increased with efficiency. In the present embodiment, the term "the same" means that the same enough to uniform substantially the electric field intensity generated at each part (unless display qualities are influenced), that is, substantially the same.

In addition, it is preferable in this case that the common electrode and the pixel electrode are positioned within each other's slit. That is, an embodiment in which the common electrode is positioned within the slit of the pixel electrode, and the pixel electrode is positioned within the slit of the common electrode is preferable. If the slit of the common electrode and the slit of the pixel electrode have substantially the same shape, a pair of electrodes composed of the pixel electrode and the common electrode which are engaged with each other can be formed. As a result, a more uniform and high-density horizontal electric field parallel to the substrates can be generated in the display medium.

It is preferable that the axis of symmetry is positioned within the slit of the common electrode. If the axis of symmetry of the pair of line-symmetric slits provided for the pixel electrode is arranged within the slit of the common electrode, a certain distance can be easily provided between the pixel electrode and the common electrode in the reflective region.

An embodiment in which a shield electrode is arranged between the pixel electrode and the common electrode in the reflective region is mentioned as a preferable embodiment of the first display device. In the present description, the "shield electrode" means an electrode which is positioned between the pixel electrode and the common electrode to change a difference in electric potential between the pixel electrode and the common electrode. Due to the shield electrode arranged between the pixel electrode and the common electrode, the difference in electric potential generated between the pixel electrode and the common electrode is smaller than that in the case that no shield electrode is arranged. If this embodiment is adopted in combination with the embodiment of the present invention, the intensity of the electric field generated between the pixel electrode and the common electrode in the reflective region can be more effectively made smaller than that in the transmissive region. The material for the shield electrode is not especially limited as long as it has conductivity. A transparent material is particularly preferable. A metal oxide such as indium tin oxide (ITO) is preferably used. The size and shape of the shield electrode are not especially limited as long as it can be arranged between the pixel electrode and the common electrode.

It is preferable that the shield electrode is connected to ground. If the shield electrode is connected to ground, a voltage applied to the shield electrode can be maintained at 0V. Further, if the shield electrode is connected to ground and thereby an electric potential of the shield electrode is 0V, an electric potential difference between the pixel electrode and the common electrode can be effectively decreased.

The present invention is a display device including: a pair of substrates; a display medium interposed between the pair of substrates; and a pixel having a reflective region for performing reflective display and a transmissive region for performing transmissive display, wherein the display device includes a pixel electrode and a common electrode on one of the pair of substrates, a voltage is applied to the display medium through the pixel electrode and the common electrode, the common electrode is provided with a plurality of slits, the plurality of slits include a pair of line-symmetric slits, and a slit arranged between the pair of line-symmetric slits, of inner contours facing each other of the pair of line-symmetric slits, one forms an angle with the other, and an axis of symmetry of the pair of line-symmetric slits is positioned in the reflective region (hereinafter, also referred to as "the second display device"). That is, in this embodiment, the pixel electrode and the common electrode in the first display device are counterchanged. The second display device of the present invention, characterized by the slit of the common electrode, also can exhibit the same effects as in the first display device of the present invention, characterized by the slit of the pixel electrode.

According to the second display device of the present invention, examples of preferable embodiments of the common electrode include an embodiment in which the common electrode has a comb-tooth shape. The following embodiments are mentioned as a preferable embodiment of the slit which is provided for the common electrode. An embodiment in which: the plurality of slits of the common electrode are entirely surrounded by the common electrode; the plurality of slits of the common electrode have a rectangular shape having at least one bent part; the plurality of slits of the common electrode have a zig-zag shape; the plurality of slits of the common electrode have a circular arc shape; and the plurality of slits of the common electrode have a meandering shape.

As another preferable embodiment of the above-mentioned common electrode, an embodiment in which the common electrode is formed in a layer different from the pixel electrode, and an insulating film is between the pixel electrode and the common electrode is mentioned. Examples of other preferable embodiments of the above-mentioned slit provided for the common electrode include: an embodiment in which the axis of symmetry is positioned within the slit arranged between the pair of line-symmetric slits; and an embodiment in which the axis of symmetry is positioned within the slit of the pixel electrode.

As a preferable embodiment of the above-mentioned pixel electrode, an embodiment in which the pixel electrode is provided with a slit is mentioned. Further, an embodiment in which the slit of the pixel electrode has substantially the same shape as a shape of the slit of the common electrode is mentioned as a preferable embodiment of the above-mentioned slit provided for the pixel electrode.

Preferable embodiments of the above-mentioned second display device include an embodiment in which a shield electrode is arranged between the common electrode and the pixel electrode in the reflective region. In this case, it is preferable that the shield electrode is connected to ground.

Thus, the other preferable embodiments of the common electrode, the preferable embodiments of the slit provided for the common electrode, the preferable embodiments of the pixel electrode, the preferable embodiments of the slit provided for the pixel electrode, and the second display device are mentioned. These embodiments are not mentioned in more detail because, in these embodiments, the pixel electrode and the common electrode in the preferable embodiments of the first display device of the present invention are just counterchanged.

Effect of the Invention

The display device of the present invention can provide bright display by both of the reflective display and the transmissive display without having a multi-gap structure. In addition, because of the absence of the multi-gap structure, the difference in response time of the liquid crystal molecule between the reflective region and the transmissive region can be decreased.

BEST MODES FOR CARRYING OUT THE INVENTION

The present invention is mentioned in more detail below with reference to the following Embodiments, but the present invention is not limited to only these Embodiments.

"Embodiment 1"

Embodiment 1 shows a liquid crystal display device that is the first or second display device of the present invention in accordance with IPS mode. FIG. 1-1 is a planar view schematically showing one pixel constituting the liquid crystal display device in Embodiment 1. FIG. 1-2 is a schematic view showing a cross section taken along dashed line A-B in FIG. 1-1. The liquid crystal display device in accordance with Embodiment 1 includes the first substrate 1, the second substrate 2, and a liquid crystal layer 3 interposed between these substrates, as shown in FIG. 1-2. The second substrate 2 includes a pixel electrode 4 and a common electrode 5, and a voltage is applied to the liquid crystal layer 3 through the pixel electrode 4 and the common electrode 5.

The first substrate 1 includes a color filter layer 6 and the first alignment film 7 on the liquid crystal layer 3 side in this order. A glass substrate can be used as the first substrate 1, for example. The color filter layer 6 includes red, green, and blue regions which are arranged in a repeating pattern. The color filter layer 6 may be composed of regions of four or more colors. Irregularities attributed to the color filter layer 6 may be flattened by a resin layer for flattening, and the like. The first alignment film 7 determines an alignment direction of the liquid crystal layer 3 near the first alignment film 7.

The second substrate 2 includes a scanning wiring 8, a common wiring 9, the first insulating layer 10, a signal wiring 11, a thin film transistor 12, the second insulating layer 13, a reflector 14, the third insulating layer 15, the pixel electrode 4, the common electrode 5, and the second alignment film 16 on the liquid crystal layer 3 side. A glass substrate can be used as the second substrate 2, similarly to the first substrate 1. The scanning wiring 8 and the signal wiring 11 are formed in different layers with the first insulating layer 10 therebetween. Further, the scanning wiring 8 and the signal wiring 11 are perpendicular to each other. The thin film transistor 12 is positioned near the intersection of the scanning wiring 8 with the signal wiring 11. The thin film transistor 12 has an inverted staggered structure. A gate electrode is connected to the scanning wiring 8; a source electrode is connected to the signal wiring 11; and a drain electrode is connected to the pixel electrode 4 through the first contact hole 17. A channel part of the thin film transistor 12 is formed of an amorphous silicon layer. The common wiring 9 is parallel to the scanning wiring 8 and it is connected to the common electrode 5 through the second contact hole 18.

Each of the pixel electrode 4 and the common electrode 5 has a comb-tooth shape, and the comb tooth (projection part) is formed to have a circular arc shape. The pixel electrode 4 and the common electrode 5 are transparent electrodes made of ITO (Indium Tin Oxide) and these electrodes are formed in the same layer. Accordingly, production steps can be simplified in comparison to the case that these electrodes are formed in different layers. According to such a liquid crystal display device in Embodiment 1, a voltage is applied to the pixel electrode 4 and the common electrode 5, and thereby a horizontal electric field is generated in the liquid crystal layer 3, which brings a change in alignment of the liquid crystal. Thus, light which passes through the liquid crystal layer 3 is controlled.

In FIGS. 1-1 and 1-2, a region which overlaps with the reflector 14 is a reflective region R, and a black part in FIG. 1-1 is a reflective region R. As shown in FIG. 1-2, reflective light 20 passes through the reflective region R. Transmissive light 21 from a backlight passes through a transmissive region T. Aluminum with a high reflectivity or a silver alloy and the like is preferable as the material for the reflector 14.

According to Embodiment 1, the pixel electrode 4 and the common electrode 5 are formed of the same material between the transmissive region T and the reflective region R. Each of the pixel electrode 4 and the common electrode 5 is provided with a plurality of slits. The plurality of slits include pairs of line-symmetric slits having a circular arc shape. In addition, between the pair of line-symmetric slits, another slit is arranged. Further, a reflective region R is formed in the region where the axis of symmetry of the pair of line-symmetric slits provided for the pixel electrode 4 is positioned between the comb tooth of the pixel electrode 4 and the comb tooth of the common electrode 5. With regard to the "circular arc" shape, it is clear that the inner contours of the line-symmetric slits each have a certain angle if the line-symmetric slits are formed to face each other.

As shown in FIG. 1-1, each comb tooth of the pixel electrode 4 and the common electrode 5 in Embodiment 1 has a circular arc shape. In the reflective region R, the circular arcs of the pixel electrode 4 and the common electrode 5 face each other with the reflective region R therebetween. In contrast, the circular arcs of the pixel electrode 4 and the common electrode 5 are lined to face the same direction in the transmissive region T. In this case, the reflective region R is formed between the circular arcs facing each other of the comb teeth of the pixel electrode 4 and the common electrode 5. Thus, according to the present Embodiment, the axis of symmetry of the pair of the line-symmetric slits provided for the pixel electrode 4 is positioned within the slit arranged between the pair of the line-symmetric slits and also positioned within the slit of the common electrode 5. In addition, according to Embodiment 1, the slit of the common electrode 5 has substantially the same shape as that of the slit of the pixel electrode 4. Further, the common electrode 5 is positioned within the slit of the pixel electrode 4, and the pixel electrode 4 is positioned within the slit of the common electrode 5. That is, according to the present Embodiment, the comb teeth of the pixel electrode 4 and the common electrode 5 are uniformly engaged with each other. In such Embodiment 1, a width of the slit of the pixel electrode 4 and a width of the slit of the common electrode 5 in the reflective region R are larger than those in the transmissive region T. Even if the pixel electrode 4 and the common electrode 5 are formed of the same material, a voltage which is applied to the liquid crystal layer 3 is different in intensity between the transmissive region T and the reflective region R. Accordingly, both of the reflective display and the transmissive display can be performed without providing the liquid crystal layer 3 with a multi-gap structure by additionally forming a step-forming layer in the reflective region R.

The second alignment film 16 is arranged on the liquid crystal layer 3 side of the pixel electrode 4. The second alignment film 16 determines a direction of the alignment of the liquid crystal layer 3 near the second alignment film 16. The minimum width of the slit of the pixel electrode 4 in the reflective region R is equivalent to the width of the slit of the pixel electrode 4 in the transmissive region T. The maximum width thereof is at least twice as large as the width of the slit of the pixel electrode 4 in the transmissive region T. Further, an average of the width of the slit of the pixel electrode 4 in the reflective region R is larger than an average of the width of the slit of the pixel electrode 4 in the transmissive region T. Thus, according to the present Embodiment, the effects of the present invention can be sufficiently exhibited.

The shape and arrangement of the pixel electrode 4 and the common electrode 5 in accordance with a modified embodiment of Embodiment 1 are mentioned below. In Embodiment 1, the shape and arrangement of the pixel electrode 4 and the common electrode 5 are not limited to those shown in FIG. 1-1. The shape and arrangement shown in FIGS. 2 to 4 may be adopted, for example.

The pixel electrode 4 and the common electrode 5 shown in FIG. 2 are different from those in FIG. 1-1. The common electrode 5 has a linear comb tooth arranged on an axis of symmetry of a pair of line-symmetric slits having a circular arc shape, provided for the pixel electrode 4. The pixel electrode 4 has a shape formed by circular arcs facing each other. The reflective region R is a region where an axis of symmetry of the line-symmetric slits is positioned between the comb teeth facing each other of the pixel electrode 4. That is, the axis of symmetry of the pair of line-symmetric slits having a circular arc shape, provided for the pixel electrode 4 is not positioned within the slit of the common electrode 5. Even in this arrangement, however, the width of the slit of the pixel electrode 4 in the reflective region R is larger than the width of the slit of the pixel electrode 4 in the transmissive region T. Therefore, the reflective region R can be formed in the region where the axis of symmetry of the pair of line-symmetric slits provided for the pixel electrode 4 is positioned.

According to the pixel electrode 4 and the common electrode 5 shown in FIG. 3, circular arcs of the pixel electrode 4 and the common electrode 5 are engaged with each other in the entire one pixel, similarly to those shown in FIG. 1-1. However, the pixel electrode 4 and the common electrode 5 shown in FIG. 3 are different from those in FIG. 1-1. The circular arcs of the pixel electrode 4 and the common electrode 5 are less curved than those shown in FIG. 1-1. Further, the reflective region R is formed not only in the region which is wide at the centers of the comb teeth of the pixel electrode 4 and the common electrode 5, shown in FIG. 1-1, but also in the region which is narrow at the centers of the comb teeth of the pixel electrode 4 and the common electrode 5. As shown in FIG. 3, the distance between bases of the comb teeth is increased, and thereby the region which is narrow at the centers of the comb teeth of the pixel electrode 4 and the common electrode 5 also serves as the reflective region R. Also in this embodiment, the reflective region R is the region formed by the pixel electrode 4 and the common electrode 5 facing each other, where the axis of symmetry of the line-symmetric slits provided for the pixel electrode 4 is positioned. Therefore, the present invention includes this embodiment. According to this arrangement, the distance between the pixel electrode 4 and the common electrode 5 is increased toward the base of the comb tooth. Therefore, this region can be used as the reflective region R.

According to the pixel electrode 4 shown in FIG. 4, the pixel electrode 4 has a linear comb tooth on an axis of symmetry of a pair of line-symmetric slits having a circular arc shape, provided for the pixel electrode 4. The common electrode 5 has a linear comb tooth on an axis of symmetry of a pair of line-symmetric slits provided for the common electrode 5. The reflective region R is formed in a region where these axes of symmetry are positioned between the comb teeth of the pixel electrode 4 facing each other. That is, the axis of symmetry of the pair of line-symmetric slits having a circular arc shape, provided for the pixel electrode 4, is not positioned within the slit arranged between the pair of line-symmetric slits. Also in this arrangement, the width of the slit of the pixel electrode 4 in the reflective region R is larger than that of the slit of the pixel electrode 4 in the transmissive region T. Therefore, the reflective region R can be formed in the region where the axis of symmetry of the pair of line-symmetric slits provided for the pixel electrode 4 is positioned.

FIGS. 5 to 7 each show an arrangement relationship among the polarizer, the retarder, and the liquid crystal molecule. FIG. 5 shows an arrangement relationship among the polarizer, the retarder, and the liquid crystal molecule under no voltage application. FIG. 6 shows an arrangement relationship among the polarizer, the retarder, and the liquid crystal molecule in the reflective region under voltage application. FIG. 7 shows an arrangement relationship among the polarizer, the retarder, and the liquid crystal molecule in the transmissive region under voltage application.

According to Embodiment 1, as shown in FIG. 1-2, the first polarizer 22 is arranged on the side opposite to the liquid crystal layer 3 of the first substrate 1, and the second polarizer 23 is arranged on the side opposite to the liquid crystal layer 3 of the second substrate 2. The first and second polarizers 22 and 23 are arranged in such a way that a transmission axis 26 of the first polarizer 22 is perpendicular to a transmission axis 27 of the second polarizer 23. The first retarder 24 is arranged between the first substrate 1 and the first polarizer 22. The second retarder 25 is arranged between the second substrate 2 and the second polarizer 23.

As shown in FIG. 5, the first retarder 24 has a retardation of ¼ wavelength, and a phase delay axis 28 of the first retarder 24 is set to make an angle of 45° with the alignment direction of the liquid crystal molecule 30 in the clockwise direction. The transmission axis 26 of the first polarizer 22 is set to be parallel to the alignment direction of the liquid crystal molecule 30. The second retarder 25 has a retardation of ¼ wavelength. The second retarder 25 is arranged in such a way that a phase delay axis 29 of the second retarder 25 is perpendicular to the phase delay axis 28 of the first retarder 24.

In the reflective region R, if a voltage of less than a threshold is applied to the pixel electrode 4 and the common electrode 5, a stacked body composed of the liquid crystal layer 3, the first polarizer 22 and the first retarder 24 functions as a circular polarizer. A linear polarized light which has passed through the first polarizer 22 is converted into a circularly-polarized light after passing through the first retarder 24. Then, the circularly-polarized light is reflected by the reflector 14 and converted into a counter-rotating circularly-polarized light. When entering the first polarizer 22 again, the light is converted into a linear polarized light whose oscillation direction is vertical to the transmission axis 26 of the first polarizer 22. Therefore, the linear polarized light is absorbed by the first polarizer 22 and dark display is obtained. If a voltage of more than a threshold is applied to the pixel electrode 4 and the common electrode 5, as shown in FIG. 6, the alignment of the liquid crystal molecule 30 is changed by a specific angle θ in the clockwise direction. As a result, incident light is reflected by the reflector 14, and then when entering the first polarizer 22 again, the light is converted into linear polarized light whose oscillation direction is parallel to the transmission axis of the first polarizer 22. Therefore, the light is not absorbed by the first polarizer 22 and bright display is obtained.

In the transmissive region T, the first retarder 24 is perpendicular to the second retarder 25. Therefore, a retardation in the normal direction of the first substrate 1 is zero, and the display in this direction is not influenced. If a voltage of less than a threshold is applied to the pixel electrode 4 and the common electrode 5, the long axis of the liquid crystal molecule 30 is perpendicular to the transmission axis 27 of the second polarizer 23. Therefore, the linear polarized light which has passed through the second polarizer 23 is a linear polarized light vertical to the transmission axis 26 of the first polarizer 22. Therefore, the light is absorbed by the first polarizer 22, and dark display is obtained. If a voltage of more than a threshold is applied to the pixel electrode 4 and the common electrode 5, as shown in FIG. 7, the alignment of the liquid crystal molecule 30 is changed by a specific angle 2θ in the clockwise direction. When entering the first polarizer 22, the light is converted into a linear polarized light whose oscillation direction is parallel to the transmission axis 26 of the first polarizer 22. Therefore, the light is not absorbed by the first polarizer 22, and bright display is obtained.

The first and second retarders 24 and 25 are made of a material which hardly shows wavelength dispersion of refractive index, for example, a norbornene material (product of JSR Corp., trade name: ARTON). In such a case, darker display which is less colored can be obtained.

Thus-prepared transflective liquid crystal display panel is connected to a driving device, and a backlight is arranged on the back face of the panel, for example. Thus, a transflective liquid crystal display device is completed.

The shape of the comb tooth of the pixel electrode 4 and the common electrode 5 in accordance with a modified embodiment of Embodiment 1 is mentioned below.

According to the present embodiment, the comb tooth (projection part) of the pixel electrode 4 and the common electrode 5 each having a comb-tooth shape may not have a circular arc shape shown in FIG. 1-1. For example, it may have a shape shown in FIGS. 8 to 11. According to the comb-tooth-shaped electrode 31 shown in FIG. 8, the comb tooth has a V shape which has one bent part at the middle of the comb tooth, like a broken line. The slit of the comb-tooth-shaped electrode 31 has a rectangular shape having one bent part. The comb tooth of the comb-tooth-shaped electrode 32 shown in FIG. 9 has two bent parts, like a broken line. The entire of the comb tooth has a substantially V shape. The slit of the comb-tooth-shaped electrode 32 has a rectangular shape having two bent parts. With regard to the comb-tooth-shaped electrode 33 shown in FIG. 10, the comb tooth has three bent parts, like a broken line. The entire of the comb tooth has a shape composed of two substantially V shapes. The slit of the comb-tooth-shaped electrode 33 has a rectangular shape having three bent parts, that is, a zig-zag shape. With regard to the comb-tooth-shaped electrode 34 shown in FIG. 11, the comb tooth has a circular-arc shape which has three curved parts. The entire of the comb tooth has a shape composed of two substantially V shapes. The slit of the comb-tooth-shaped electrode 35 has a meandering shape. In addition, with regard to the shape of the pixel electrode 4 and/or the common electrode 5, the reflective region R is a region where an axis of symmetry of the pair of line-symmetric slits is positioned, as shown in FIGS. 8 to 11.

FIG. 12 is a schematic view showing the pixel electrode 4 and the common electrode 5 in Embodiment 1. FIG. 12(a) is a planar view schematically showing the pixel electrode 4 and the common electrode 5. FIGS. 12(b), 12(c), and 12(d) are schematic views each showing a cross section taken along dashed line C-D in FIG. 12(a). The arrangement relationship between the pixel electrode 4 and the common electrode 5 is not especially limited to the embodiment in which the electrodes are formed in the same layer, as shown in FIG. 12(b). As shown in FIG. 12(c), the pixel electrode 4 may be formed in a layer closer to the liquid crystal layer 3 than the common electrode 5. As shown in FIG. 12(d), the common electrode 5 may be formed in a layer closer to the liquid crystal layer 3 than the pixel electrode 4.

According to Embodiment 1, a shield electrode may be arranged between comb teeth of the pixel electrode 4 and/or the common electrode 5 positioned in the reflective region R. FIG. 13 is a schematic view showing a shield electrode 50 arranged between the pixel electrode 4 and the common electrode 5 in Embodiment 1. FIG. 13(a) is a planar view. FIG. 13(b) is a schematic view showing a cross section taken along dashed line C-D in FIG. 13(a). Due to the shield electrode 50 arranged between the pixel electrode 4 and the common electrode 5 in the reflective region R, the intensity of the electric field generated between the pixel electrode 4 and the common electrode 5 can be decreased. Therefore, if the shield electrode 50 is arranged in the reflective region R and further the pixel electrode 4 and/or the common electrode 5 are/is provided with the pair of line-symmetric slits, the intensity of the electric field generated between the pixel electrode 4 and the common electrode 5 in the reflective region R can be more effectively made smaller than that in the transmissive region T. In this case, it is preferable that the shield electrode 50 is connected to ground.

"Embodiment 2"

Embodiment 2 shows a liquid crystal display device that is the first or second display device of the present invention in accordance with FFS mode. FIG. 14-1 is a planar view schematically showing one pixel constituting a liquid crystal display device in accordance with Embodiment 2. FIG. 14-2 is a schematic view showing a cross section taken along dashed line E-F in FIG. 14-1. The liquid crystal display device in accordance with Embodiment 2 includes the first substrate 101, the second substrate 102, and a liquid crystal layer 103 interposed between these substrates, as shown in FIG. 14-2. The second substrate 102 includes a pixel electrode 104 and a common electrode 105. A voltage is applied to the liquid crystal layer 103 through the pixel electrode 104 and the common electrode 105.

The first substrate 101 includes a color filter layer 106 and the first alignment film 107 on the liquid crystal layer 103 side in this order. A glass substrate may be used as the first substrate 101, for example. The color filter layer 106 includes red, green, and blue regions which are arranged in a repeating pattern. The color filter layer 106 may be composed of regions of four or more colors. Irregularities attributed to the color filter layer 106 may be flattened by a resin layer for flattening, and the like. The first alignment film 107 determines an alignment direction of the liquid crystal layer 103 near the first alignment film 107.

The second substrate 102 includes a scanning wiring 108, a common wiring 109, the first insulating layer 110, a signal wiring 111, a thin film transistor 112, the second insulating layer 113, a reflector 114, the third insulating layer 115, a common electrode 105, the fourth insulating film 119, a pixel electrode 104, and the second alignment film 116 on the liquid crystal layer 103 side. A glass substrate can be used as the second substrate 102, similarly to the first substrate 101, for example. The scanning wiring 108 and the signal wiring 111 are formed in different layers with the first insulating layer 110 therebetween. Further, the scanning wiring 108 and the signal wiring 111 are perpendicular to each other. The thin film transistor 112 is positioned near the intersection of the scanning wiring 108 with the signal wiring 111. The thin film transistor 112 has an inverted staggered structure. The gate electrode is connected to the scanning wiring 108 and the source electrode is connected to the signal wiring 111. The drain electrode is connected to the pixel electrode 104 through the first contact hole 117. The channel part of the thin film transistor 112 is formed of an amorphous silicon layer. The common wiring 109 is parallel to the scanning wiring 108 and it is connected to the common electrode 105 through the second contact hole 118.

The pixel electrode 104 has a comb-tooth shape, and the comb tooth (projection part) is formed to have a circular arc shape. The common electrode 105 is formed over the entire pixel and it is positioned in a layer lower than the pixel electrode 104 with the fourth insulating layer 119 therebetween. The pixel electrode 104 and the common electrode 105 are transparent electrodes made of indium tin oxide (ITO). According to such a liquid crystal display device in Embodiment 2, a voltage is applied to the liquid crystal layer 103 through the pixel electrode 104 and the common electrode 105, thereby generating a horizontal electric field in the liquid crystal layer 103. As a result, a change in alignment is generated in the liquid crystal layer 103. As a result, light which passes through the liquid crystal layer 103 is controlled.

In FIGS. 14-1 and 14-2, the region overlapping with the reflector 114 is a reflective region R. A black part in FIG. 14-1 is a reflective region R. As shown in FIG. 14-2, reflective light 120 passes through the reflective region R. Transmissive light 121 from a backlight passes through the transmissive region T. Aluminum or a silver alloy and the like, having a high reflectance, is preferable as the material for the reflector 114.

According to Embodiment 2, the pixel electrode 104 and the common electrode 105 are formed of the same material between the transmissive region T and the reflective region R. The pixel electrode 104 is provided with a plurality of slits. The plurality of slits include pairs of line-symmetric slits having a circular arc shape. In addition, between the pair of line-symmetric slits, another slit is arranged. The reflective region R is formed in the region where the axis of symmetry of the pair of line-symmetric slits provided for the pixel electrode 104 is positioned between adjacent two comb teeth of the pixel electrode 104.

As shown in FIG. 14-1, each comb tooth of the pixel electrode 104 in accordance with Embodiment 2 has a circular arc shape. In the reflective region R, the comb teeth are formed in such a way that the circular arcs of the pixel electrode 104 face each other with the reflective region R therebetween. In contrast, the circular arcs of the pixel electrode 104 are lined to face the same direction in the transmissive region T. According to the present Embodiment, the axis of symmetry of the pair of line-symmetric slits provided for the pixel electrode 104 is positioned within the slit arranged between this pair of line-symmetric slits. According to Embodiment 2, the width of the slit of the pixel electrode 104 in the reflective region R is larger than the width of the slit of the pixel electrode 104 in the transmissive region T. Accordingly, both of the reflective display and the transmissive display can be performed without providing the liquid crystal layer 103 with a multi-gap structure by additionally forming a step-forming layer in the reflective region R. The second alignment film 116 is further provided on the liquid crystal layer 103 side of the pixel electrode 104. The second alignment film 116 determines the alignment direction of the liquid crystal layer 103 near the second alignment film 116. According to Embodiment 2, the common electrode 105 and the pixel electrode 104 are arranged in different layers with an insulating film therebetween. Further, according to Embodiment 2, the minimum width of the slit of the pixel electrode 104 in the reflective region R is equivalent to the width of the slit of the pixel electrode 104 in the transmissive region T. The maximum width thereof is at least twice as large as the width of the slit of the pixel electrode 104 in the transmissive region T. Further, an average of the width of the slit of the pixel electrode 104 in the reflective region R is larger than an average of the width of the slit of the pixel electrode 104 in the transmissive region T. Thus, according to the present Embodiment, the effects of the present invention can be sufficiently exhibited.

The arrangement relationship among the polarizer, the retarder, and the liquid crystal molecule in Embodiment 2 is the same as in Embodiment 1. The first polarizer 122 is arranged on the side opposite to the liquid crystal layer of the first substrate 101. The second polarizer 123 is arranged on the side opposite to the liquid crystal layer of the second substrate 102. The first and second polarizers 122 and 123 are arranged in such a way that transmission axes thereof are perpendicular to each other. Between the first substrate 101 and the first polarizer 122, the first retarder 124 is arranged. Between the second substrate 102 and the second polarizer 123, the second retarder 125 is arranged. The first retarder 124 has a retardation of ¼ wavelength and a phase delay axis of the first retarder 124 is set to make an angle of 45° with the alignment direction of the liquid crystal molecule in the clockwise direction. The first polarizer 122 has a transmission axis parallel to the alignment direction of the liquid crystal molecule. The second retarder 125 has a retardation of ¼ wavelength, and a phase delay axis of the second retarder 125 is perpendicular to the phase delay axis of the first retarder 124.

The first and second retarders 124 and 125 are made of a material which hardly shows wavelength dispersion of refractive index, for example, a norbornene material (product of JSR Corp., trade name: ARTON). In such a case, darker display which is less colored can be obtained.

Thus-prepared transflective liquid crystal display panel is connected to a driving device, and a backlight is arranged on the back face of the panel, for example. Thus, a transflective liquid crystal display device is completed.

According to Embodiment 2, the shape and arrangement of the pixel electrode 104 and the common electrode 105 are not limited to those shown in FIG. 14-1. The shape and arrangement shown in FIG. 15 may be adopted, for example.

The pixel electrode 104 shown in FIG. 15 is different from that in FIG. 14-1. The circular arc of the pixel electrode 104 is less curved than that shown in FIG. 14-1. Further, the reflective region R is formed not only in the region which is wide at the centers of the adjacent two comb teeth of the pixel electrode 104, shown in FIG. 14-1, but also in the region which is narrow at the centers of the adjacent two comb teeth of the pixel electrode 104. As shown in FIG. 15, the distance between bases of the comb teeth is increased, and thereby the region which is narrow at the centers of the adjacent two comb teeth of the pixel electrode 104 serves as the reflective region R. Also in this embodiment, the reflective region R is the region formed by the adjacent two comb teeth facing each other of the pixel electrode 104, where the axis of symmetry of the line-symmetric slits provided for the pixel electrode 104 is positioned. Therefore, this embodiment is included in the present invention. According to this arrangement, the distance between the comb teeth of the pixel electrode 104 is increased toward the base of the comb tooth. Therefore, this region can be used as the reflective region R.

The comb tooth of the pixel electrode 104 in accordance with a modified embodiment of Embodiment 2 is mentioned below.

According to Embodiment 2, the comb tooth (projection part) of the pixel electrode 104 having a comb-tooth shape may not have a circular arc shape shown in FIG. 14-1. For example, it may have a shape shown in FIGS. 8 to 11. In Embodiment 2, the pixel electrode 104 may not have a comb-tooth shape, and it may be an electrode 35 which has a substantially elliptical slit entirely surrounded by the pixel electrode 104, as shown in FIG. 16.

FIG. 17 is a planar view schematically showing the pixel electrode 104 and the common electrode 105 in accordance with Embodiment 2. FIG. 17(*a*) is a planar view schematically showing the pixel electrode 104 and the common electrode 105. FIGS. 17(*b*) and 17(*c*) are schematic views each showing a cross section taken along dashed line G-H in FIG. 17(*a*). The arrangement relationship between the pixel electrode 104 and the common electrode 105 is not limited to the embodiment shown in FIG. 17(*b*), in which the pixel electrode 104 is formed closer to the liquid crystal layer 103 than the common electrode 115. As shown in FIG. 17(*c*), the common electrode 105 may be arranged closer to the liquid crystal layer 103 than the pixel electrode 104.

According to Embodiment 2, similarly to Embodiment 1, a shield electrode may be arranged between comb teeth of the pixel electrode 104 positioned in the reflective region R. FIG. 18 is a schematic view showing a shield electrode 150 arranged between the pixel electrode 104 and the common electrode 105 in Embodiment 2. FIG. 18(*a*) is a planar view. FIG. 18(*b*) is a schematic view showing a cross section taken along dashed line G-H in FIG. 18(*a*). Similarly to Embodiment 1, due to the shield electrode 150 arranged between the pixel electrode 104 and the common electrode 105 in the reflective region R, the intensity of the electric field generated between the pixel electrode 104 and the common electrode 105 can be decreased in the reflective region R. Therefore, if the shield electrode 150 is arranged and further the pixel electrode 104 is provided with the pair of line-symmetric slits, the intensity of the electric field generated between the pixel electrode 104 and the common electrode 105 in the reflective region R can be more effectively made smaller than that in the transmissive region T. In this case, it is preferable that the shield electrode 150 is connected to ground, similarly to Embodiment 1.

According to the display device in Embodiment 2, as shown in FIG. 19, the common electrode 105 may be formed to have a comb-tooth shape, and the pixel electrode 104 may be formed over the entire pixel. That is, the structure of the pixel electrode 104 and that of the common electrode 105 may be counterchanged in the above-mentioned embodiment. In such an embodiment, the effects of the present invention can be exhibited.

The present application claims priority under the Paris Convention and the domestic law in the country to be entered into national phase on Patent Application No. 2006-210902 filed in Japan on Aug. 2, 2006, the entire contents of which are hereby incorporated by reference.

The term "or more" in the present description means that the value described (boundary value) is included.

BRIEF DESCRIPTION OF DRAWINGS

FIG. 1-2 is a schematic view showing a cross section taken along dashed line A-B shown in FIG. 1-1.

FIG. 2 is a planar view schematically showing a modified embodiment of Embodiment 1 (the linear comb tooth of the common electrode is formed on the axis of symmetry of the pair of line-symmetric slits provided for the pixel electrode).

FIG. 12(a) is a schematic planar view. FIGS. 12(b), 12(c), and 12(d) are schematic views each showing a cross section taken along dashed line C-D in FIG. 11(a).

FIG. 13(a) is a schematic planar view. FIG. 13(b) is a schematic view showing a cross section taken along dashed line C-D in FIG. 13(a).

FIG. 14-1 is a planar view schematically showing one pixel constituting the liquid crystal display device (FFS mode) in Embodiment 2.

FIG. 14-2 is a schematic view showing a cross section taken along dashed line E-F in FIG. 14-1.

FIG. 17(a) is a schematic planar view. FIGS. 17(b) and 17(c) are schematic views each showing a cross section taken along dashed line G-H in FIG. 17(a).

FIG. 18(a) is a schematic planar view. FIG. 18(b) is a schematic view showing a cross section taken along dashed line G-H in FIG. 18(a).

Figure 1:
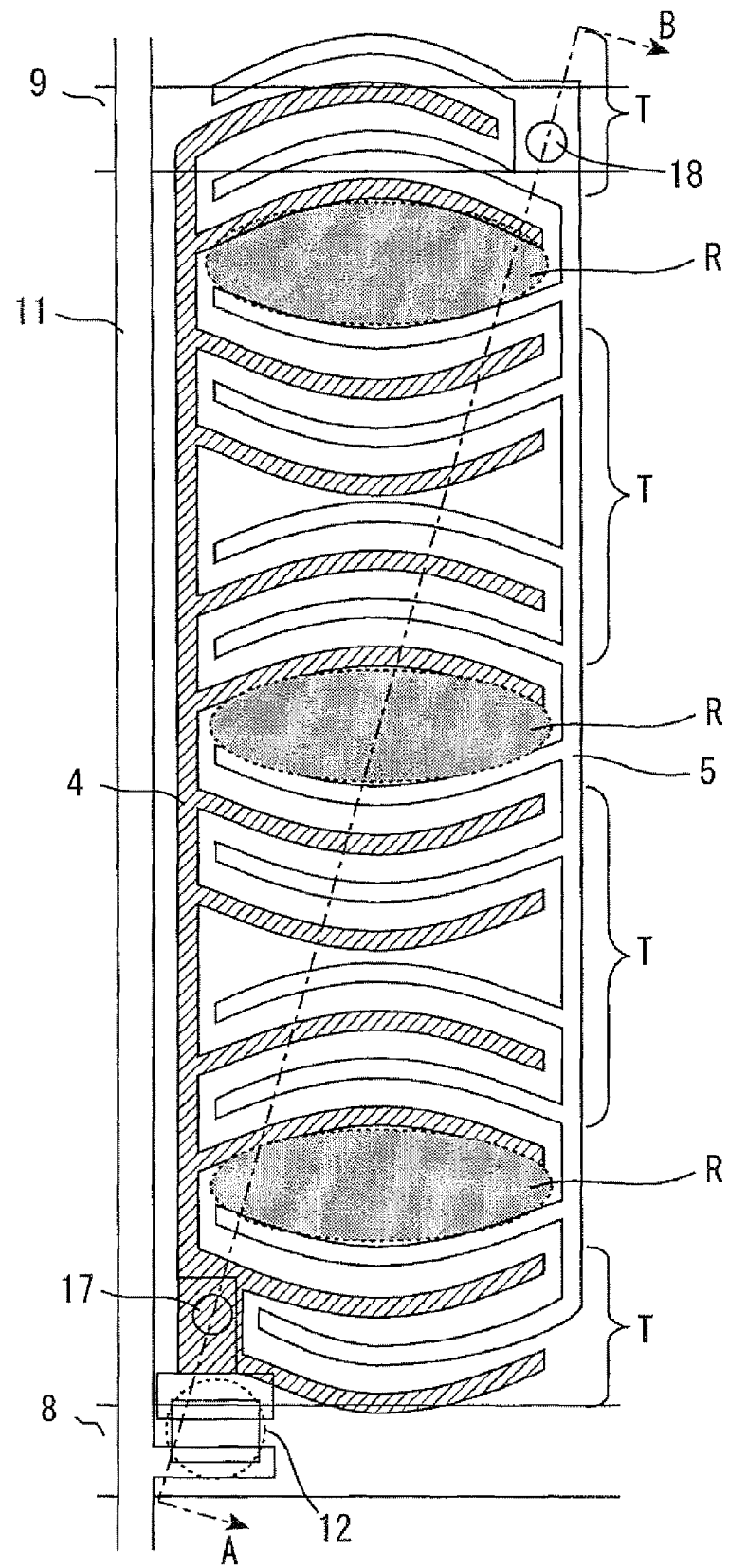
FIG. 1-1 is a planar view schematically showing one pixel constituting the liquid crystal display device (IPS mode) in accordance with Embodiment 1.
Figures 1, 2:
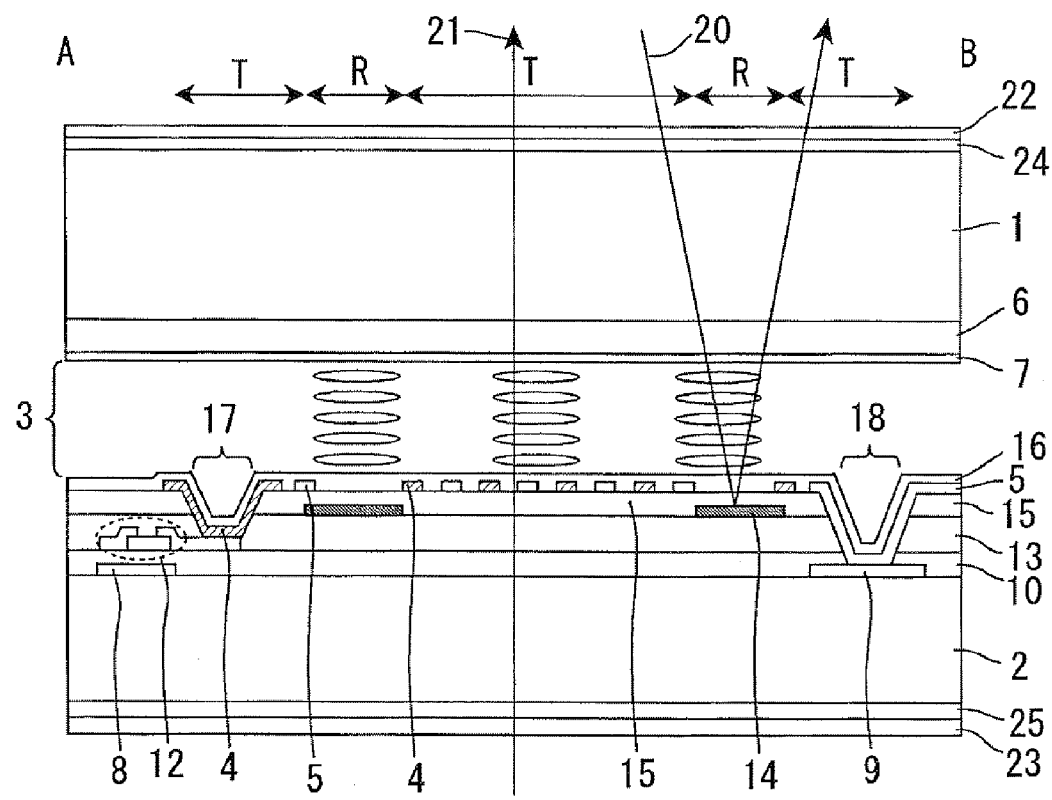
Figure 2:
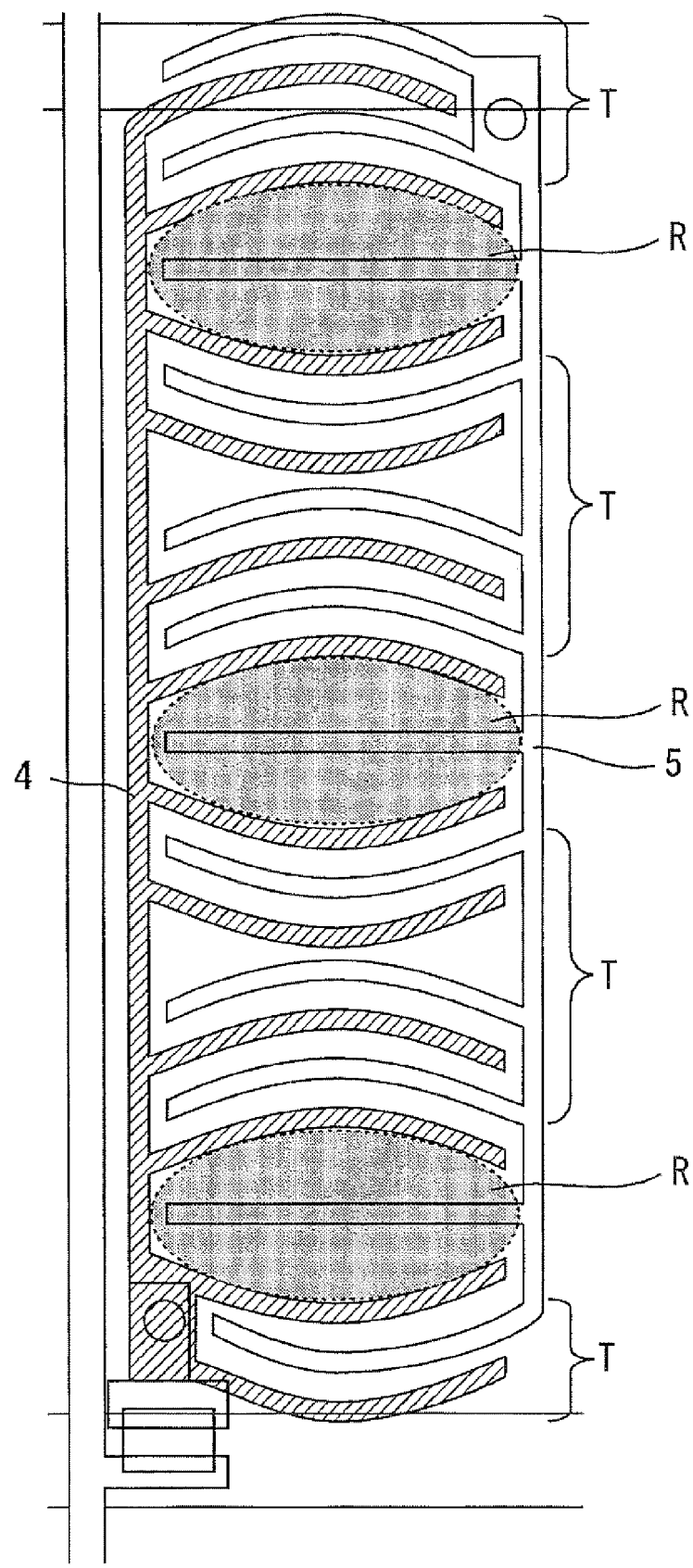
Figure 3:
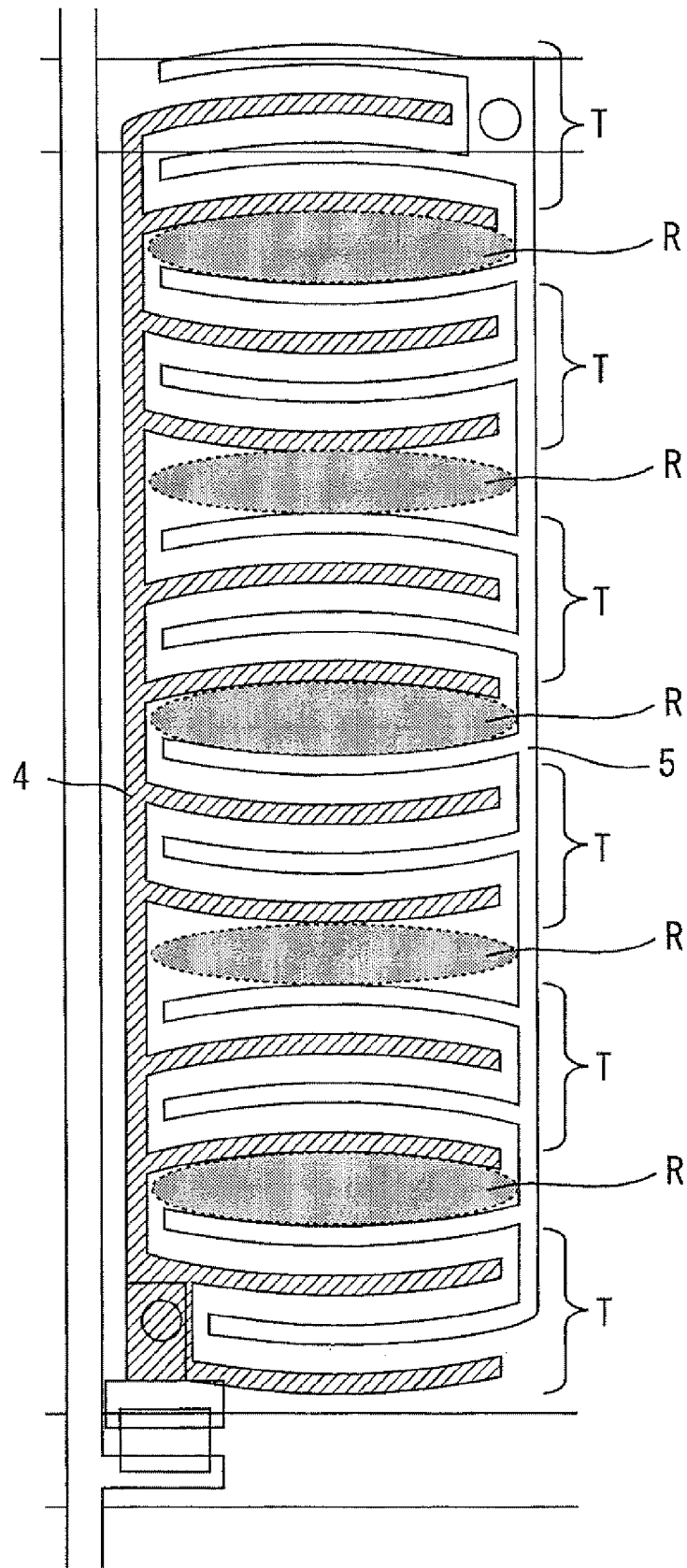
FIG. 3 is a planar view schematically showing a modified embodiment of Embodiment 1 (the reflective region is also formed in the region which is narrow at the centers of the comb teeth of the pixel electrode and the common electrode).
Figure 4:
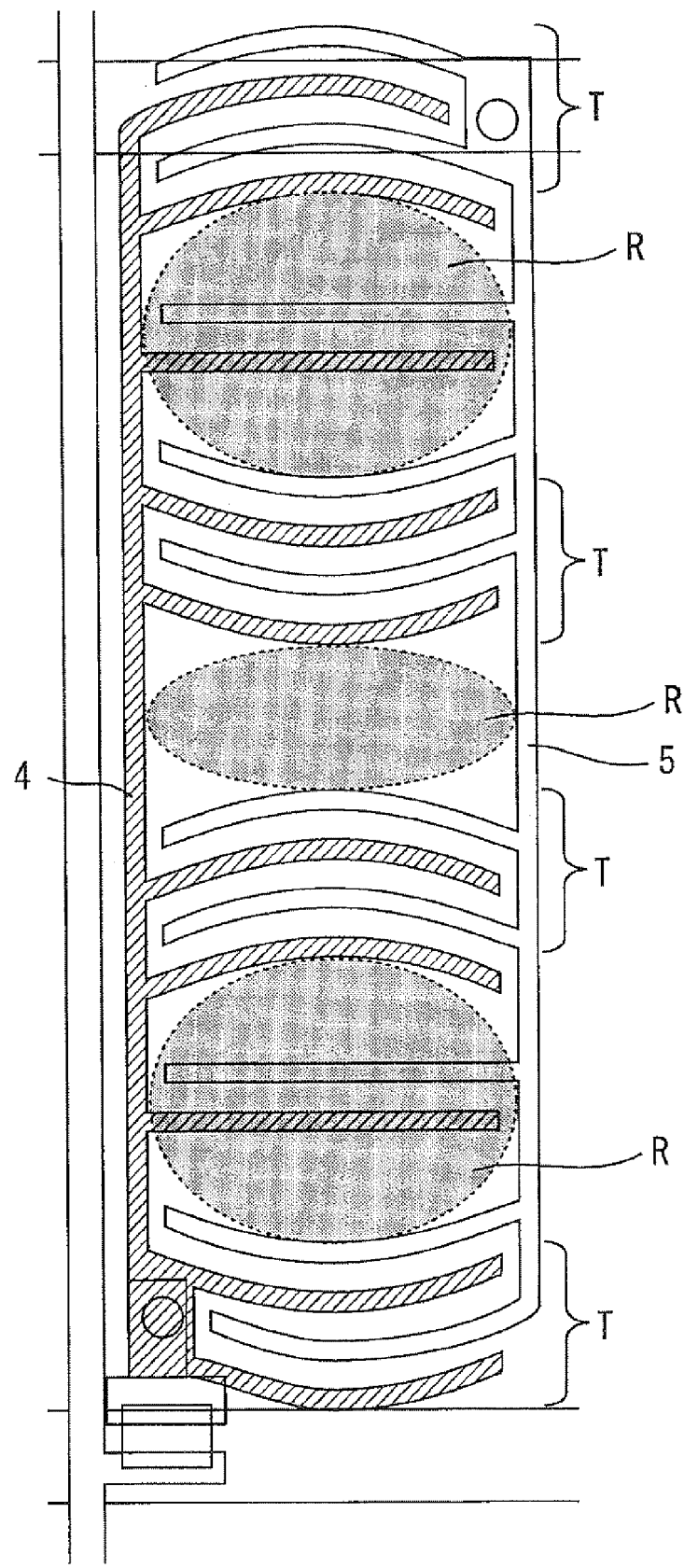
FIG. 4 is a planar view schematically showing a modified embodiment of Embodiment 1 (the linear comb tooth of the pixel electrode is formed on the axis of symmetry of the pair of line-symmetric slits provided for the pixel electrode).
Figure 5:
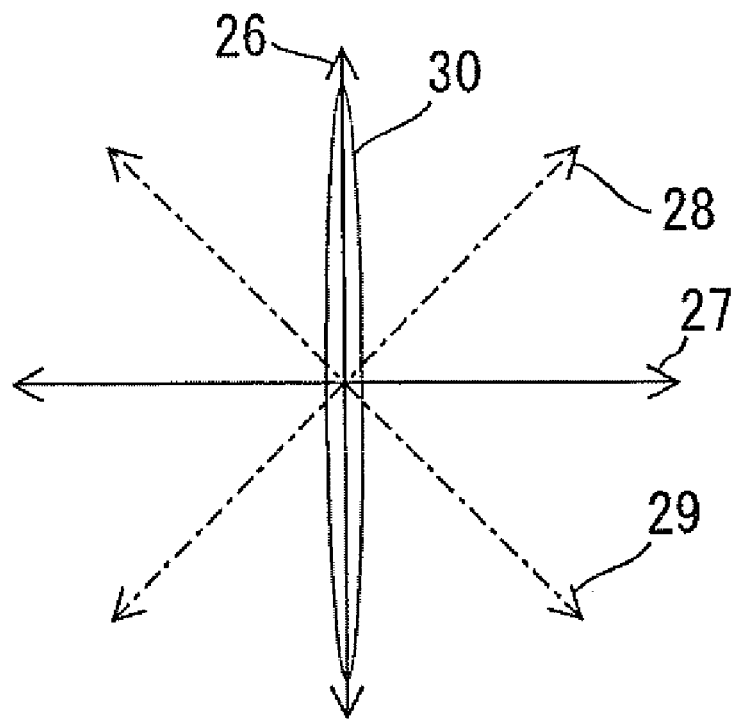
FIG. 5 is a schematic view showing arrangement relationship among the polarizer, the retarder, and the liquid crystal molecule during no voltage application in accordance with Embodiments 1 to 3.
Figure 6:
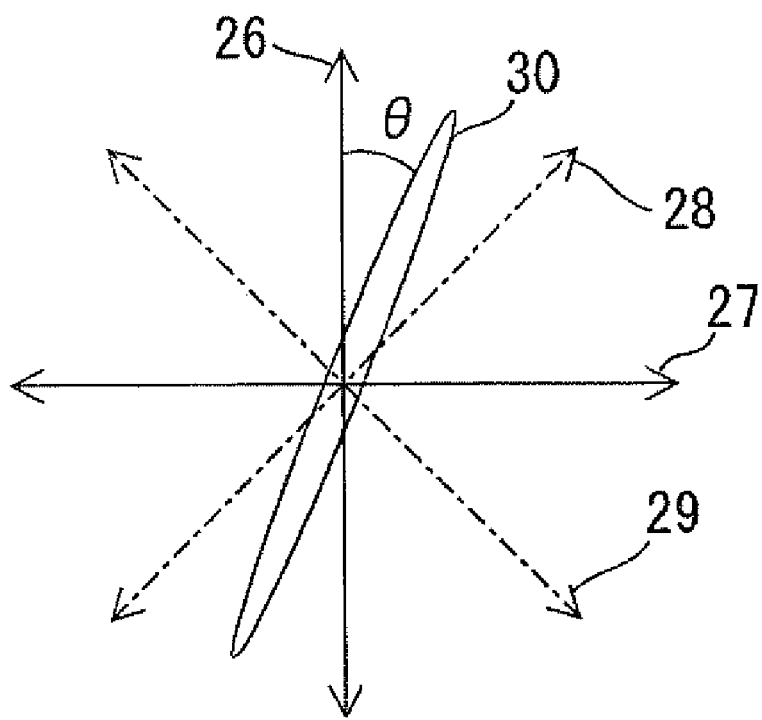
FIG. 6 is a schematic view showing arrangement relationship among the polarizer, the retarder, and the liquid crystal molecule in the reflective region during voltage application in accordance with Embodiments 1 to 3.
Figure 7:
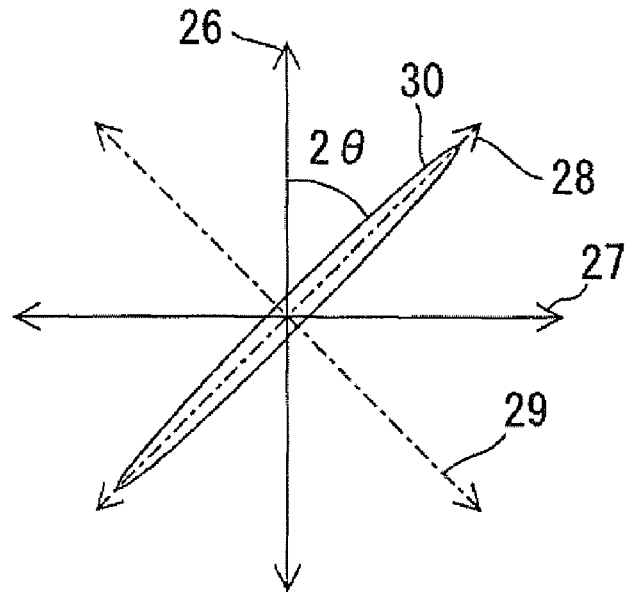
FIG. 7 is a schematic view showing arrangement relationship among the polarizer, the retarder, and the liquid crystal molecule in the transmissive region during voltage application in accordance with Embodiments 1 to 3.
Figure 8:
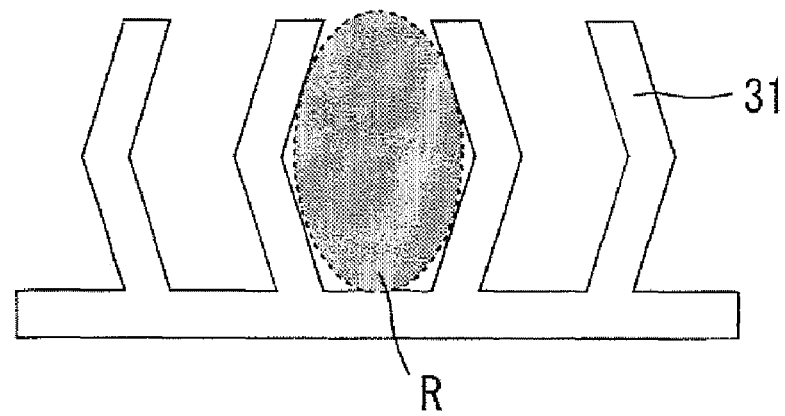
FIG. 8 is a planar view schematically showing an electrode (either or both of the pixel electrode and the common electrode) in accordance with a modified embodiment (the rectangular slit has one bent part) of Embodiment 1.
Figure 9:
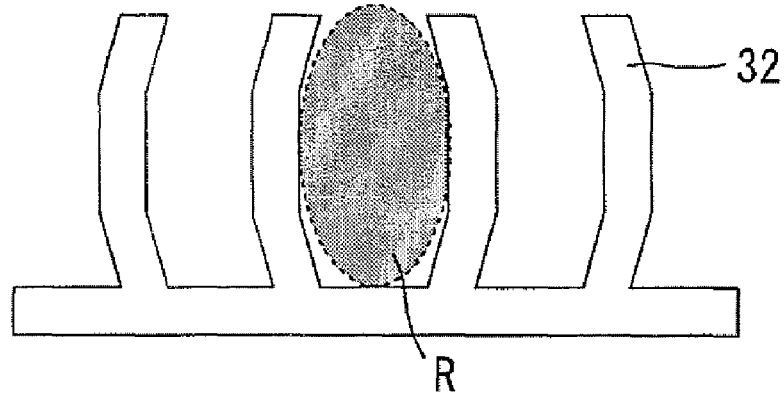
FIG. 9 is a planar view schematically showing an electrode (either or both of the pixel electrode and the common electrode) in accordance with a modified embodiment (the rectangular slit has two bent parts) of Embodiment 1.
Figure 10:
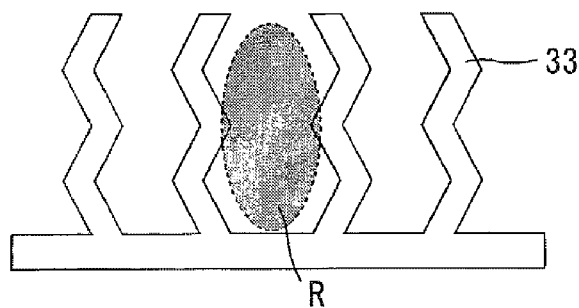
FIG. 10 is a planar view schematically showing an electrode (either or both of the pixel electrode and the common electrode) in accordance with a modified embodiment (the rectangular slit has three bent parts) of Embodiment 1.
Figure 11:
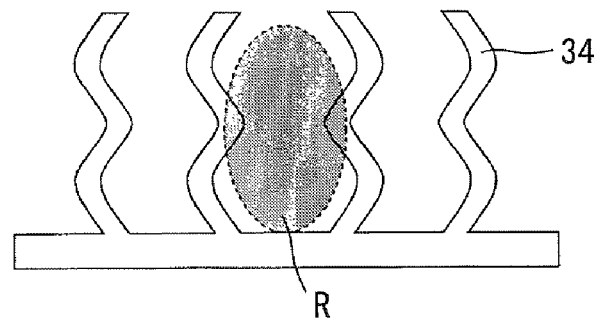
FIG. 11 is a planar view schematically showing an electrode (either or both of the pixel electrode and the common electrode) in accordance with a modified embodiment (the slit has a meandering shape) of Embodiment 1.
Figure 12:
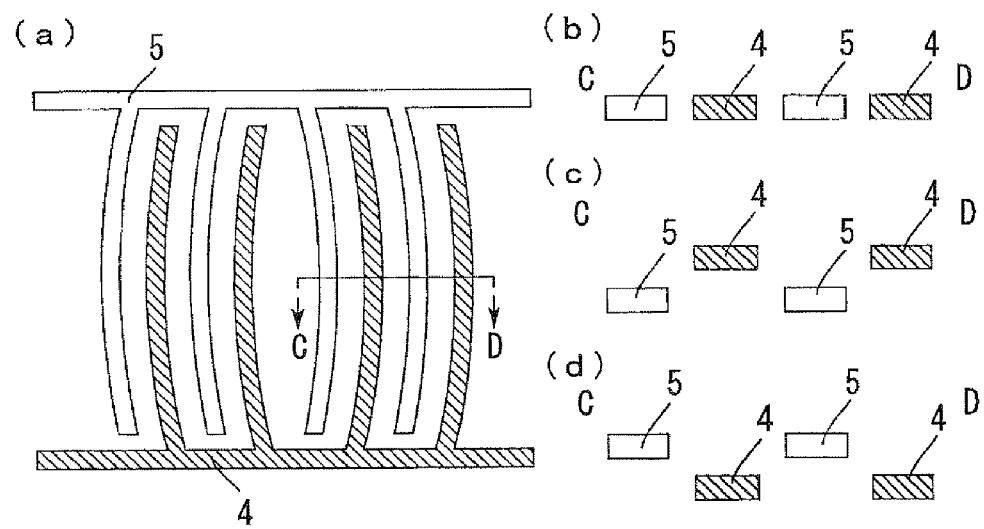
FIG. 12 is a schematic view showing the pixel electrode and the common electrode (the slit has a circular arc shape) in accordance with Embodiment 1.
Figure 13:
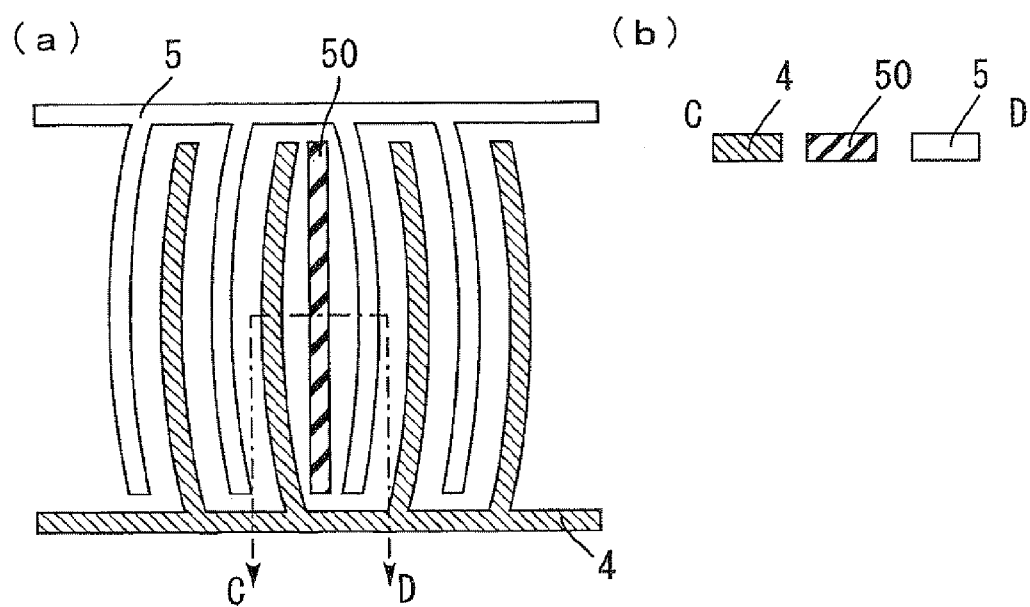
FIG. 13 is a planar view schematically showing a modified embodiment of Embodiment 1 (the shield electrode is arranged between the pixel electrode and the common electrode).
Figures 1, 14:
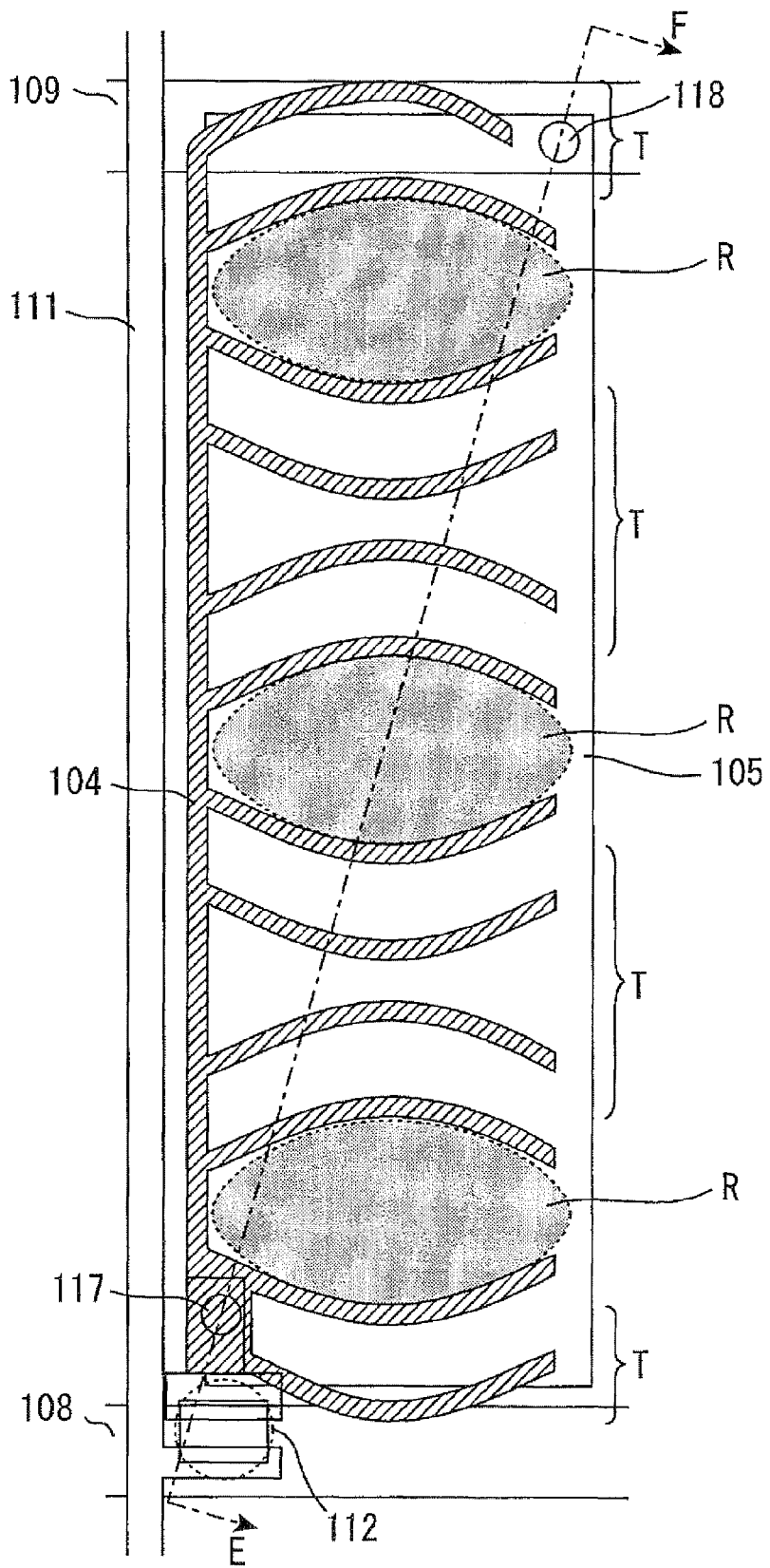
Figures 2, 14:
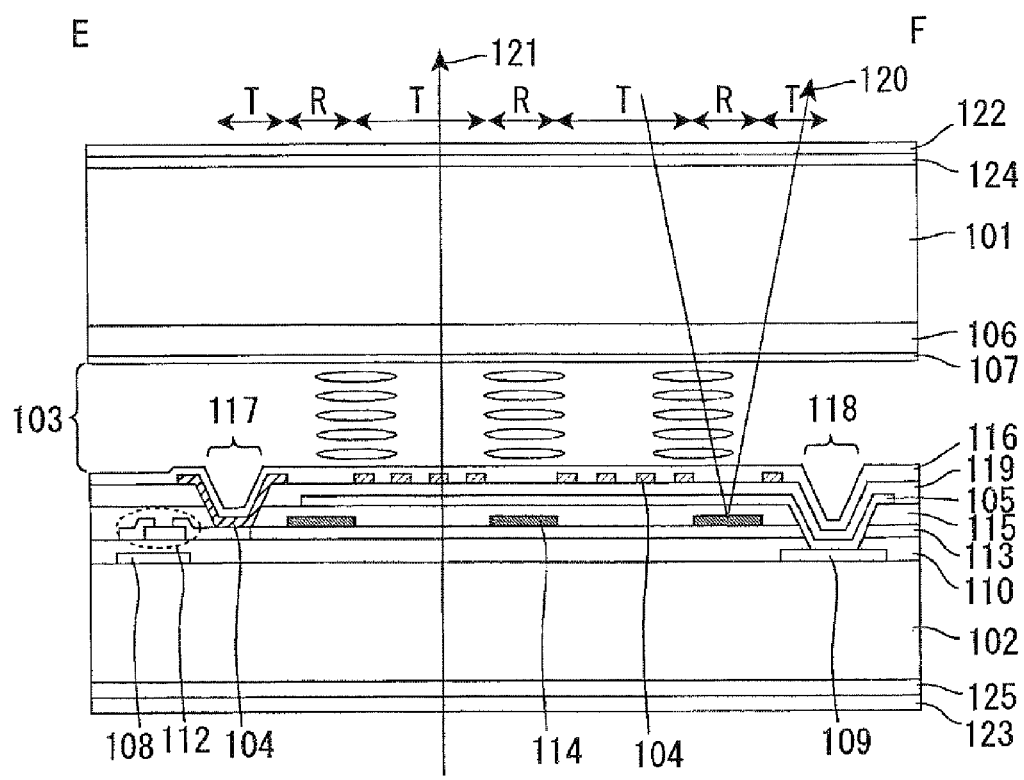
Figure 15:
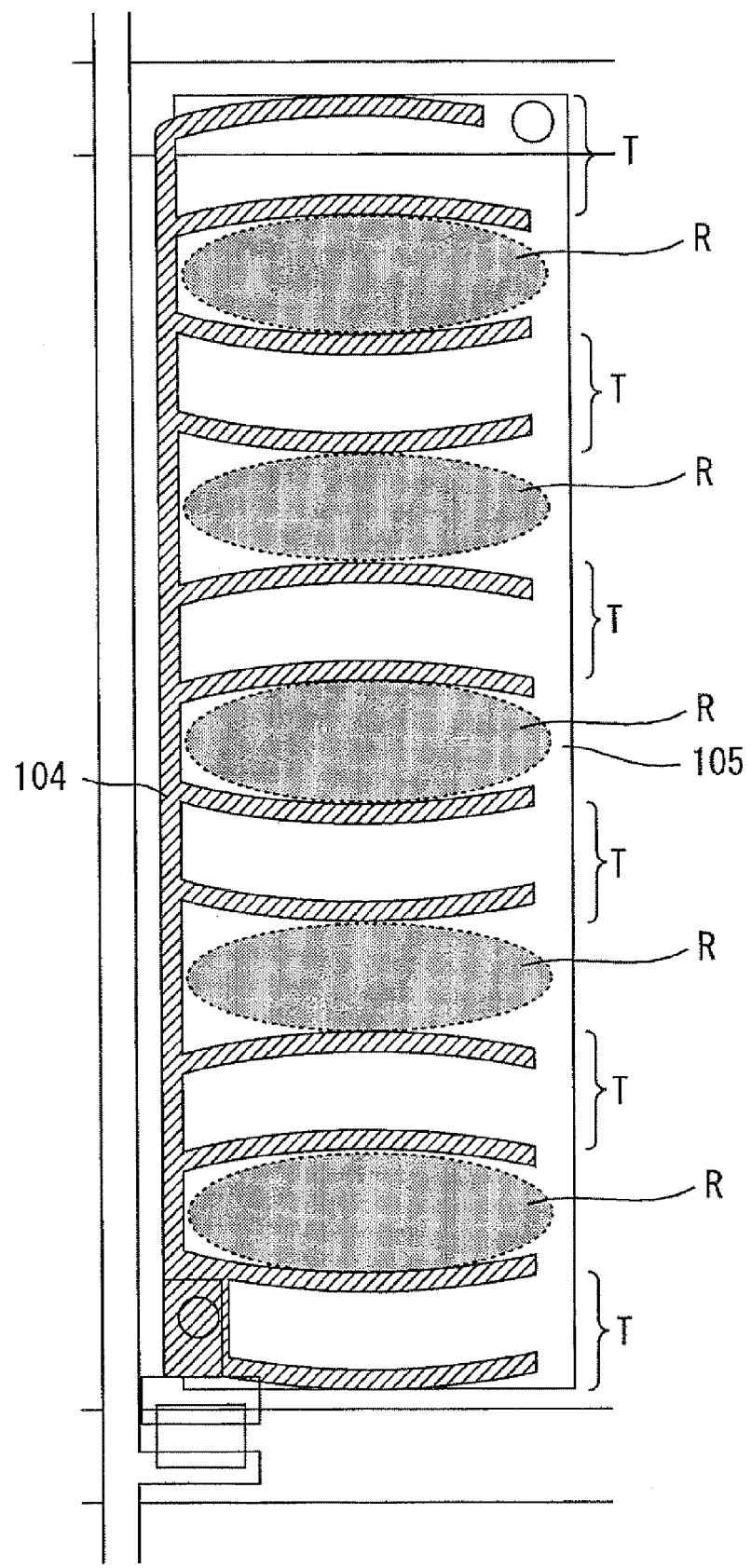
FIG. 15 is a planar view schematically showing a modified embodiment of Embodiment 1 (the reflective region is also formed in the region which is narrow at the centers of adjacent two comb teeth of the pixel electrode).
Figure 16:
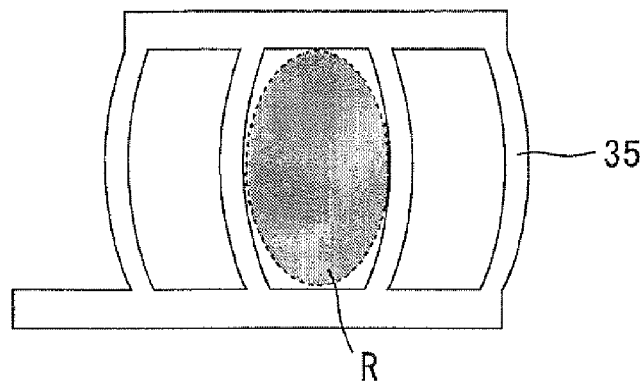
FIG. 16 is a planar view schematically showing an electrode (either the pixel electrode or the common electrode) in accordance with a modified embodiment (the slit is entirely surrounded by the electrode) of Embodiment 1.
Figure 17:
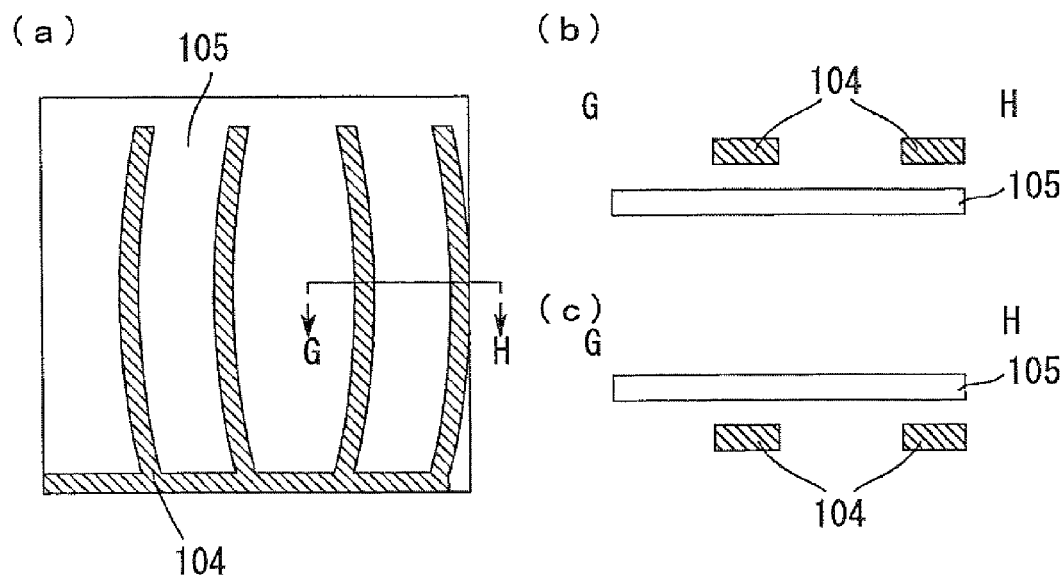
FIG. 17 is a schematic view showing the pixel electrode and the common electrode (the slit has a circular arc shape) in accordance with Embodiment 2.
Figure 18:
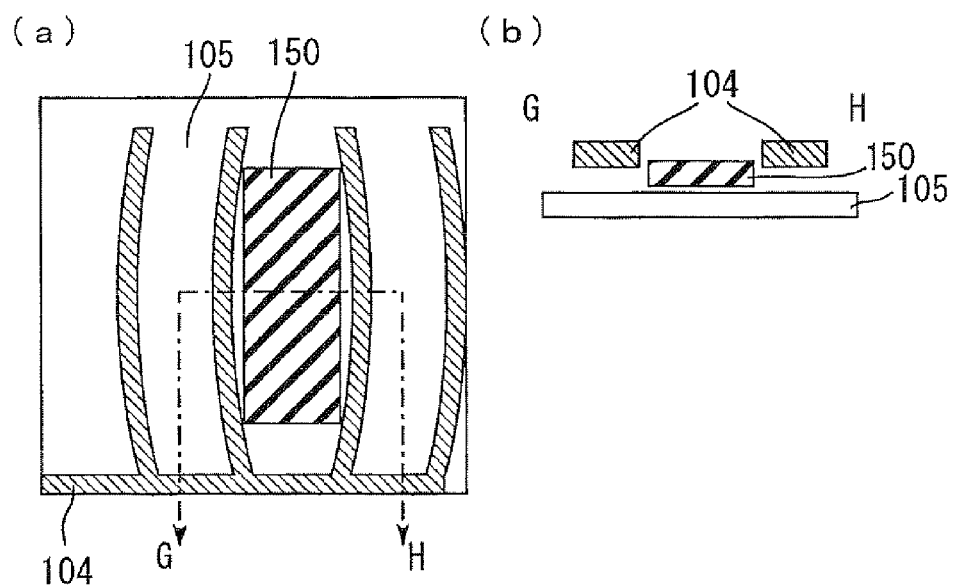
FIG. 18 is a planar view schematically showing a modified embodiment of Embodiment 2 (the shield electrode is arranged between the pixel electrode and the common electrode).
Figure 19:
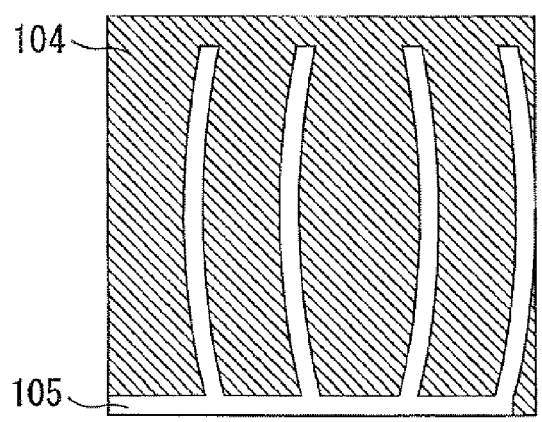
FIG. 19 is a planar view schematically showing a modified embodiment of Embodiment 2 (the common electrode has a comb-tooth shape and the pixel electrode is formed over the pixel).

EXPLANATION OF NUMERALS AND SYMBOLS 1, 101: The first substrate
2, 102: The second substrate
3, 103: Liquid crystal layer
4, 104: Pixel electrode
5, 105: Common electrode
6, 106: Color filter layer
7, 107: The first alignment film
8, 108: Scanning wiring
9, 109: Common wiring
10, 110: The first insulating layer
11, 111: Signal wiring
12, 112: Thin film transistor
13, 113: The second insulating layer
14, 114: Reflector
15, 115: The third insulating layer
16, 116: The second alignment film
17, 117: The first contact hole
18, 118: The second contact hole
20, 120: Reflective light
21, 121: Transmissive light
22, 122: The first polarizer
23, 123: The second polarizer
24, 124: The first retarder
25, 125: The second retarder
26: Transmission axis of the first polarizer
27: Transmission axis of the second polarizer
28: Phase delay axis of the first retarder
29: Phase delay axis of the second retarder
30: Liquid crystal molecule
31: Comb-tooth-shaped electrode (the rectangular slit has one bent part)
32: Comb-tooth-shaped electrode (the rectangular slit has two bent parts)
33: Comb-tooth-shaped electrode (the rectangular slit has three bent parts)
34: Comb-tooth-shaped electrode (the slit has a meandering shape)
35: Electrode (the slit is entirely surrounded by the electrode)
50, 150: Shield electrode
119: The fourth insulating layer
T: Transmissive region
R: Reflective region

The invention claimed is:

1. A display device comprising: a pair of substrates; a display medium interposed between the pair of substrates; and a pixel having a reflective region for performing reflective display and a transmissive region for performing transmissive display,
wherein the display device includes a pixel electrode and a common electrode on one of the pair of substrates,
a voltage is applied to the display medium through the pixel electrode and the common electrode,
the pixel electrode is provided with a plurality of slits,
the plurality of slits include a pair of line-symmetric slits, and a slit arranged between the pair of line-symmetric slits,
of inner contours facing each other of the pair of line-symmetric slits, one forms an angle with the other, and
an axis of symmetry of the pair of line-symmetric slits is positioned in the reflective region, wherein the axis of symmetry is positioned within the slit arranged between the pair of line-symmetric slits.

2. The display device according to claim 1, wherein the pixel electrode has a comb-tooth shape.

3. The display device according to claim 1, wherein the plurality of slits of the pixel electrode are entirely surrounded by the pixel electrode.

4. The display device according to claim 1, wherein the plurality of slits of the pixel electrode have a rectangular shape having at least one bent part.

5. The display device according to claim 1, wherein the plurality of slits of the pixel electrode have a zig-zag shape.

6. The display device according to claim 1, wherein the plurality of slits of the pixel electrode have a circular arc shape.

7. The display device according to claim 1, wherein the plurality of slits of the pixel electrode have a meandering shape.

8. The display device according to claim 1, wherein the common electrode is formed in a layer different from the pixel electrode, and
an insulating film is between the pixel electrode and the common electrode.

9. The display device according to claim 1, wherein the common electrode is provided with a slit.

10. The display device according to claim 9, wherein the common electrode is arranged in a layer where the pixel electrode is formed.

11. The display device according to claim 9,
wherein the slit of the common electrode has substantially the same shape as a shape of the slit of the pixel electrode.

12. The display device according to claim 11,
wherein the common electrode and the pixel electrode are positioned within each other's slit.

13. A display device comprising: a pair of substrates; a display medium interposed between the pair of substrates; and a pixel having a reflective region for performing reflective display and a transmissive region for performing transmissive display,
wherein the display device includes a pixel electrode and a common electrode on one of the pair of substrates,
a voltage is applied to the display medium through the pixel electrode and the common electrode,
the pixel electrode is provided with a plurality of slits,
the plurality of slits include a pair of line-symmetric slits, and a slit arranged between the pair of line-symmetric slits,
of inner contours facing each other of the pair of line-symmetric slits, one forms an angle with the other,
an axis of symmetry of the pair of line-symmetric slits is positioned in the reflective region,
wherein the common electrode is provided with a slit, and
wherein the axis of symmetry is positioned within the slit of the common electrode.

14. A display device comprising: a pair of substrates; a display medium interposed between the pair of substrates; and a pixel having a reflective region for performing reflective display and a transmissive region for performing transmissive display,
wherein the display device includes a pixel electrode and a common electrode on one of the pair of substrates,
a voltage is applied to the display medium through the pixel electrode and the common electrode,
the pixel electrode is provided with a plurality of slits,
the plurality of slits include a pair of line-symmetric slits, and a slit arranged between the pair of line-symmetric slits,
of inner contours facing each other of the pair of line-symmetric slits, one forms an angle with the other,
an axis of symmetry of the pair of line-symmetric slits is positioned in the reflective region,
wherein a shield electrode is arranged between the pixel electrode and the common electrode in the reflective region.

15. The display device according to claim 14,
wherein the shield electrode is connected to ground.

16. A display device comprising: a pair of substrates; a display medium interposed between the pair of substrates; and a pixel having a reflective region for performing reflective display and a transmissive region for performing transmissive display,
wherein the display device includes a pixel electrode and a common electrode on one of the pair of substrates,
a voltage is applied to the display medium through the pixel electrode and the common electrode,
the common electrode is provided with a plurality of slits,
the plurality of slits include a pair of line-symmetric slits, and a slit arranged between the pair of line-symmetric slits,
of inner contours facing each other of the pair of line-symmetric slits, one forms an angle with the other, and
an axis of symmetry of the pair of line-symmetric slits is positioned in the reflective region, wherein the axis of symmetry is positioned within the slit arranged between the pair of line-symmetric slits.

17. The display device according to claim 16,
wherein the common electrode has a comb-tooth shape.

18. The display device according to claim 16,
wherein the plurality of slits of the common electrode are entirely surrounded by the common electrode.

19. The display device according to claim 16,
wherein the plurality of slits of the common electrode have a rectangular shape having at least one bent part.

20. The display device according to claim 16,
wherein the plurality of slits of the common electrode have a zig-zag shape.

21. The display device according to claim 16,
wherein the plurality of slits of the common electrode have a circular arc shape.

22. The display device according to claim 16,
wherein the plurality of slits of the common electrode have a meandering shape.

23. The display device according to claim 16,
wherein the common electrode is formed in a layer different from the pixel electrode, and
an insulating film is between the pixel electrode and the common electrode.

24. The display device according to claim 16,
wherein the pixel electrode is provided with a slit.

25. The display device according to claim 24,
wherein the slit of the pixel electrode has substantially the same shape as a shape of the slit of the common electrode.

26. A display device comprising:
a pair of substrates; a display medium interposed between the pair of substrates; and a pixel having a reflective region for performing reflective display and a transmissive region for performing transmissive display,
wherein the display device includes a pixel electrode and a common electrode on one of the pair of substrates,
a voltage is applied to the display medium through the pixel electrode and the common electrode,
the common electrode is provided with a plurality of slits,
the plurality of slits include a pair of line-symmetric slits, and a slit arranged between the pair of line-symmetric slits,
of inner contours facing each other of the pair of line-symmetric slits, one forms an angle with the other,
an axis of symmetry of the pair of line-symmetric slits is positioned in the reflective region,
wherein the pixel electrode is provided with a slit, and
wherein the axis of symmetry is positioned within the slit of the pixel electrode.

27. A display device comprising:
a pair of substrates; a display medium interposed between the pair of substrates; and a pixel having a reflective region for performing reflective display and a transmissive region for performing transmissive display,
wherein the display device includes a pixel electrode and a common electrode on one of the pair of substrates,
a voltage is applied to the display medium through the pixel electrode and the common electrode,
the common electrode is provided with a plurality of slits,
the plurality of slits include a pair of line-symmetric slits, and a slit arranged between the pair line-symmetric slits,
of inner contours facing each other of the pair of line-symmetric slits, one forms an angle with the other,
an axis of symmetry of the pair of line-symmetric slits is positioned in the reflective region, and
wherein a shield electrode is arranged between the common electrode and the pixel electrode in the reflective region.

28. The display device according to claim 27,
wherein the shield electrode is connected to ground.

* * * * *